(12) United States Patent
Matsumoto

(10) Patent No.: US 7,305,527 B2
(45) Date of Patent: Dec. 4, 2007

(54) RECORDING APPARATUS

(75) Inventor: Kissei Matsumoto, Kanagawa (JP)

(73) Assignee: Sony Corporation (JP)

( * ) Notice: Subject to any disclaimer, the term of this patent is extended or adjusted under 35 U.S.C. 154(b) by 495 days.

(21) Appl. No.: 10/101,656

(22) Filed: Mar. 20, 2002

(65) Prior Publication Data

US 2002/0188461 A1 Dec. 12, 2002

Related U.S. Application Data

(62) Division of application No. 09/427,120, filed on Oct. 26, 1999, now Pat. No. 6,542,870.

(30) Foreign Application Priority Data

Oct. 27, 1998 (JP) ............................... P10-305471

(51) Int. Cl.
*G06F 12/00* (2006.01)
(52) U.S. Cl. ..................... 711/156; 711/148; 711/161; 711/162; 709/213; 369/33
(58) Field of Classification Search .................. 705/1; 369/33; 711/156, 148, 161, 162; 709/213
See application file for complete search history.

(56) References Cited

U.S. PATENT DOCUMENTS

| | | | | |
|---|---|---|---|---|
| 4,677,604 A | * | 6/1987 | Selby et al. | 369/30.27 |
| 5,355,302 A | * | 10/1994 | Martin et al. | 700/234 |
| 5,513,169 A | * | 4/1996 | Fite et al. | 720/718 |
| 5,629,867 A | * | 5/1997 | Goldman | 381/77 |
| 5,751,672 A | | 5/1998 | Yankowski | 369/30 |
| 5,771,354 A | * | 6/1998 | Crawford | 709/229 |
| 5,829,046 A | * | 10/1998 | Tzelnic et al. | 711/162 |
| 5,987,525 A | | 11/1999 | Roberts et al. | 709/248 |
| 6,031,795 A | | 2/2000 | Wehmeyer | 369/30 |
| 6,067,562 A | * | 5/2000 | Goldman | 709/206 |

(Continued)

FOREIGN PATENT DOCUMENTS

DE    4023632 A1 *  1/1992

(Continued)

OTHER PUBLICATIONS

Diamond Multimedia Announces Rio PMP300 Portable MP3 Music Player, Sep. 14, 1998, Harmony Central, Inc.*

(Continued)

*Primary Examiner*—Naresh Vig
(74) *Attorney, Agent, or Firm*—Lerner, David, Littenberg, Krumholz & Mentlik, LLP

(57) ABSTRACT

A recording and/or playback apparatus for recording data read out from a first storage medium into a second storage medium, includes a recording device for recording data read out from the first storage medium into the second storage medium, an input unit for inputting identification data identifying the first storage medium in accordance with an operation carried out by the user, and a controller for executing control to associate additional information generated on the basis of the identification data input by the input unit with the data read out from the first storage medium during or after a recording operation carried out by the recording into the second storage medium.

10 Claims, 15 Drawing Sheets

U.S. PATENT DOCUMENTS

| | | | | |
|---|---|---|---|---|
| 6,128,255 | A | 10/2000 | Yankowski | 369/30 |
| 6,128,625 | A | 10/2000 | Yankowski | 707/104 |
| 6,154,773 | A | 11/2000 | Roberts et al. | 709/219 |
| 6,161,132 | A | 12/2000 | Roberts et al. | 709/219 |
| 6,243,328 | B1 | 6/2001 | Fenner et al. | 369/30 |
| 6,272,078 | B2 | 8/2001 | Yankowski | 369/30 |
| 6,288,991 | B1 | 9/2001 | Kajiyama et al. | 369/47.23 |
| 6,295,555 | B1 * | 9/2001 | Goldman | 709/219 |
| 6,393,430 | B1 | 5/2002 | Van Ryzin | 707/104 |

FOREIGN PATENT DOCUMENTS

| | | |
|---|---|---|
| JP | 07-182837 | 7/1995 |
| JP | 07-296008 | 11/1995 |
| JP | 08037506 | 2/1996 |
| JP | 08138357 | 5/1996 |
| JP | 08147948 | 6/1996 |
| JP | 08306124 | 11/1996 |
| JP | 08306170 | 11/1996 |
| JP | 2000322297 | 2/1997 |
| JP | 10116472 | 5/1998 |
| JP | 10-233081 | 9/1998 |
| JP | 08233081 | 9/1998 |
| JP | 2000315217 | 11/2000 |
| JP | 2000331468 | 11/2000 |
| JP | 2001273748 | 10/2001 |
| WO | WO9705616 | 2/1997 |
| WO | WO9825269 | 6/1998 |
| WO | WO9847080 | 10/1998 |

OTHER PUBLICATIONS

IBM CICS OS/2 Version 2 Developer Kit, May 1994, IBM Corporation.*

MP3 For Beginners, Jul. 3, 1998, Zoo, Inc., mp3.com printed through www.archive.org.*

Robert Lemos, Diamond To Release MP3 Walkman, Sep. 14, 1998, ZDNet.*

Information on Sonique Audio Player, 1998.*

* cited by examiner

FIG. 7

MANAGEMENT FILE
- ALBUM INFORMATION
  - FILE TYPE/COUNT
  - ALBUM TITLE
  - DATA SIZE
  - DATE
  - RELEVANT-PEOPLE NAMES
  - COPYRIGHT INFORMATION
  - ALBUM ID
  - OTHER TYPES OF MANAGEMENT INFORMATION

- FILE INFORMATION (#1)
  - FILE TYPE
  - ADDRESS POINTER
  - DATA SIZE
  - TITLE
  - DATE
  - RELEVANT-PEOPLE NAMES
  - COPYRIGHT INFORMATION
  - PLAYBACK INHIBIT FLAG
  - OTHER TYPES OF MANAGEMENT INFORMATION

⋮

- FILE INFORMATION (#m)
  - FILE TYPE
  - ADDRESS POINTER
  - DATA SIZE
  - TITLE
  - DATE
  - RELEVANT-PEOPLE NAMES
  - COPYRIGHT INFORMATION
  - PLAYBACK INHIBIT FLAG
  - OTHER TYPES OF MANAGEMENT INFORMATION

- RELEVANT FILE INFORMATION
  - FILE TYPE/COUNT
  - ADDRESS POINTER
  - DATA SIZE
  - DATE
  - RELEVANT-PEOPLE NAMES
  - COPYRIGHT INFORMATION
  - OTHER TYPES OF MANAGEMENT INFORMATION

FIG. 8

SEARCH DATA BASE

| BAR-CODE NO. | ALBUM INFORMATION | TRACK #1 INFORMATION | ... | TRACK #n INFORMATION | RELEVANT INFORMATION |
|---|---|---|---|---|---|
| 0 0 1 0 1 0 9 8 1 2 3 4 1 | ABC ------ | ------ | | ------ | ------ |
| 1 0 2 3 5 8 1 9 8 2 1 4 2 | BEST HITS ------ | ------ | | ------ | ------ |
| 0 0 0 1 0 0 1 0 2 8 9 9 1 | O×O ------ | ------ | | ------ | ------ |
| ...... | ...... | ...... | | ...... | ...... |

FIG. 11

ADDITIONAL INFORMATION INPUT

ENTER A BAR-CODE

| 1 | 2 | 3 |
|---|---|---|
| 4 | 5 | 6 |
| 7 | 8 | 9 |
|   | 0 |   |

SEARCH

FIG. 12

ADDITIONAL INFORMATION INPUT

ENTER A BAR-CODE 1 2 3 4 5 0 0 9 8 7 6 0 1 2

| 1 | 2 | 3 |
|---|---|---|
| 4 | 5 | 6 |
| 7 | 8 | 9 |
|   | 0 |   |

SEARCH

F I G. 15

ADDITIONAL INFORMATION SEARCH RESULT

| ALBUM TITLE | :GREATEST HITS. | FREE |
|---|---|---|
| ARTIST | :ABC BAND | |
| TRACK 1 | :LOVE BLUES. | 10 YEN |
| TRACK 2 | :YOU | 20 YEN |
| ... | ... | 20 YEN |
| TRACK 10 | :THE END | 20 YEN |

401 402

☒☒☐☒   ☐

IS IT CORRECT INFORMATION?

OK   CANCEL

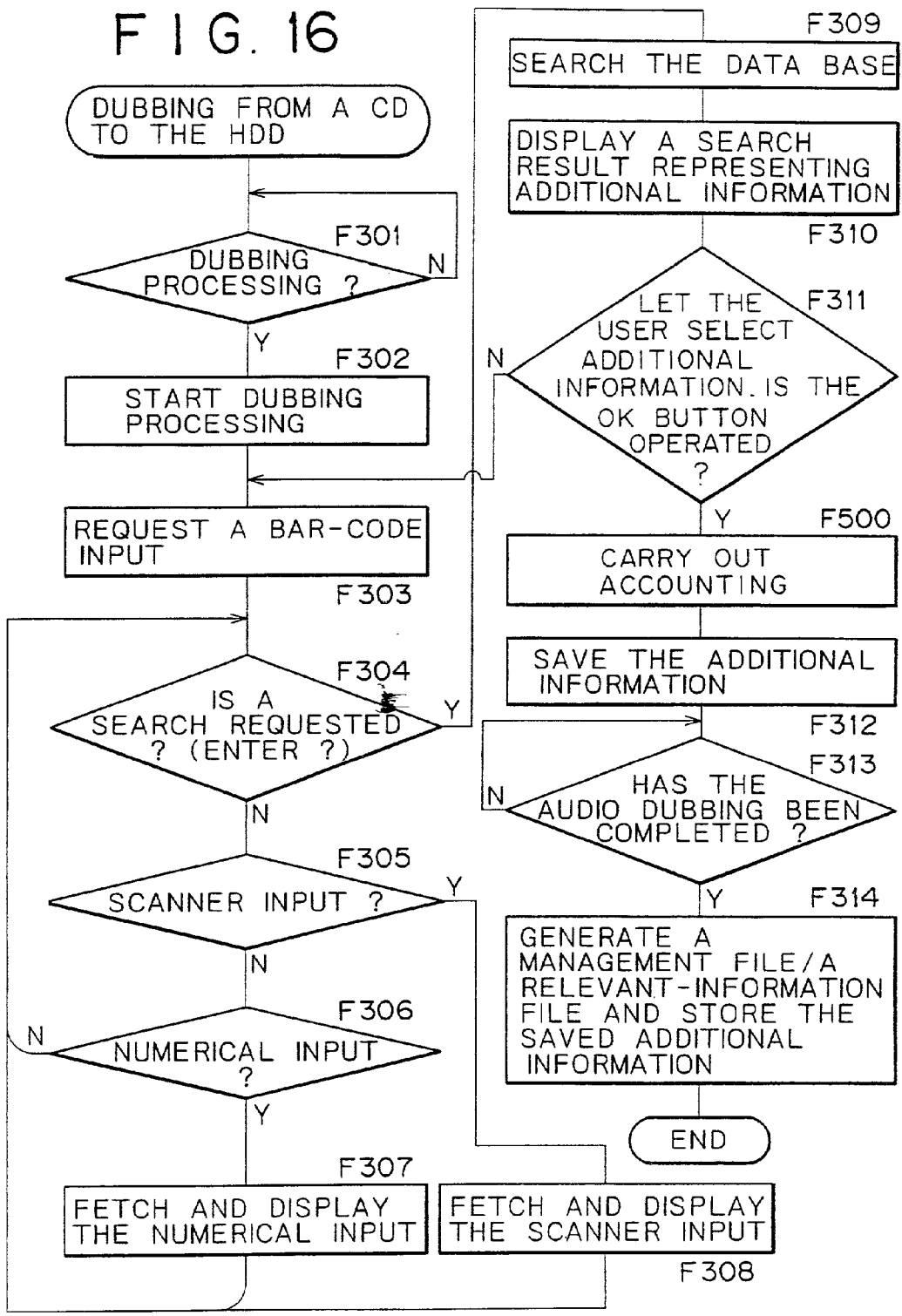

RECORDING APPARATUS

This application is a divisional of U.S. patent application No. 09/427,120 filed Oct. 26, 1999 which issued as U.S. Pat. No. 6,542,870 on Apr. 1, 2003, the disclosure of which is hereby incorporated herein by reference, which claims priority of Japanese Patent Application No. 10-305471, filed on Oct. 27, 1998, the entirety of which is incorporated by reference herein.

BACKGROUND OF THE INVENTION

1. Field of the Invention

The present invention relates to a recording apparatus capable of recording and storing data from a storage medium which is presented as package media.

2. Background of the Invention

Various kinds of audio-visual equipment owned by the user have been becoming popular, generally allowing the user to individually enjoy musical and video software.

For example, the user owns typically an audio system for disc recording media such as a CD (Compact Disc, a trademark) or an MD (Mini Disc, a trademark). The user purchases a desired CD or MD which is available in the market as package media to be played back by using the audio system. The user may also purchase an MD as recordable media and creates an original disc by recording pieces of music selected by the user itself onto the MD. The MD is an optical magnetic disc or an optical disc with a diameter of 64 mm and can be used for recording a compressed audio signal of 80 minutes in length. In the following description, an MD is assumed as disc recording media unless otherwise specified.

By the way, development of a recording/playback apparatus to be used as new audio-visual equipment not available so far is under way. The new recording/playback apparatus uses typically recording media with a large storage capacity such as a hard disc for storing audio-data files and video-data files.

For example, package media owned by the user such as a CD is capable of recording typically a piece of music recorded on the CD onto typically a hard disc employed in the recording/playback apparatus by carrying out a dubbing operation. By employing a storage medium with a large storage capacity such as a hard disc in the recording/playback apparatus, the system is capable of storing for example all pieces of music recorded typically on a plurality of CDs or the like owned by the user in the recording/playback system.

When the user desires to play back a piece of music, for example, the user does not have to take the trouble to search the recording media for a CD or the like containing the desired piece of music and mount the CD or the like on the recording/playback apparatus. Instead, the user may just specify the desired piece of music and have the specified music read out and played back from the hard disc employed in the recording/playback apparatus. Thus, such a recording/playback apparatus is very convenient particularly for a user having a lot of recording media such as CDs. In addition, it is not necessary for the user to carry out operations like dismounting a storage medium such as a CD from the recording/playback apparatus and mounting another replacement medium thereon. As a result, the user is capable of easily enjoying typically pieces of music selected in accordance with the mood of the day for example and played back from the recording/playback apparatus.

By providing for example a portable recording/playback apparatus capable of transferring or copying data such as pieces of music from a storage medium like a hard disc employed in the recording/playback apparatus to the portable apparatus, some pieces of music that the user desires to listen to on that day can be selected from a large repertoire and typically copied from the recording/playback apparatus to the portable apparatus. In this way, the desired pieces of music can be played back from the portable recording/playback apparatus.

The user is thus capable of enjoying pieces of music or the like with ease by using such a recording/playback apparatus and such a portable recording/playback apparatus. In order to use the recording/playback apparatus as a musical server with a greater added value, the hard disc of the apparatus is used for storing not only data such as pieces of music, but also conceivably information related to the data as additional information appended to the data.

The additional information relevant to music or the like dubbed from a CD for example is typically information associated with musical data such as the title of the album, the name of the artist, the title of the song and the name of the song writer. The additional information can also be graphic data and a picture of the artist which normally appear on the jacket of the album.

By storing these pieces of additional information along with data such as pieces of music in the recording/playback apparatus, the recording/display apparatus is capable of displaying the name of a song, the name of an artist and a relevant picture such as graphic data or a photograph appearing on the jacket of an album to the user.

Assume for example that the user dubs data from a CD on hand to a hard disc employed in the recording/playback apparatus. In this case, there is raised a problem as to how the recording/playback apparatus acquires additional information to the data dubbed by the user.

As one method to append such additional information, an organization is established to render services to provide additional information. In this case, it is conceivable to connect the recording/playback apparatus owned by the user to the service organization by a transmission line. To put it in detail, when the user dubs musical data from a CD owned by the user to a hard disc employed in the recording/playback apparatus, the recording/playback apparatus transmits information identifying the CD to the service organization. The information identifying the CD typically indicates the title and the type of the CD as a product. The service organization then recognizes the attributes of the CD such as the title of the album, the names of the artists and the titles of the songs on the basis of the information on the basis of the identification information, and transmits the attributes to the recording/playback apparatus as additional information. The recording/playback apparatus records the additional information received from the service organization onto the hard disc, associating the information with the musical data.

The information used for identifying the attributes of the CD is used in the service organization as a key to search for the additional information. It is desirable that the information serving as a key such as the title and the type of the CD as a product can be fetched by the recording/playback apparatus from the CD and is unique to the attributes of the CD. It is thus conceivable to use data of the TOC (Table of Contents) of the CD, which serves as management information of the CD, as information serving as a key.

The service organization needs a data base for storing additional information associated with TOC data serving as the title and the type of the CD as a product for CDs available in the market.

In a system wherein TOC data is used as a key to search the data base for additional information as described above, however, there is raised a problem that it is quite within the bounds of possibility that incorrect additional information is obtained as a search result.

This is because, as is generally known, the numbers of tracks having recorded data and start positions of the tracks on a CD are controlled by using the TOC, and it is quite within the bounds of possibility that CDs with titles different from each other have the same TOC data. On the other hand, CDs having the same title may have different pieces of TOC data due to conditions of the process to manufacture the discs.

For the reasons described above, when TOC data is used as a key for searching a data base for additional information, the additional information obtained as a result of the search may have nothing to do with data dubbed from the CD at all, or there may be a case in which no additional information is obtained from the search. As a result, the system has a lack of reliability.

SUMMARY OF THE INVENTION

It is thus an object of the present invention to solve the problems described above.

In order to achieve the object described above, the present invention provides a recording and/or playback apparatus for recording data read out from a first storage medium into a second storage medium, said apparatus comprising:

- a recording unit for recording data read out from said first storage medium into said second storage medium;
- an input unit for inputting identification data identifying said first storage medium in accordance with an operation carried out by the user; and
- a control unit for executing control to associate additional information generated on the basis of identification data input by said input unit with data read out from said first storage medium during or after an operation carried out by said recording unit to record said data read out from said first storage medium into said second storage medium.

BRIEF DESCRIPTION OF THE DRAWINGS

FIG. 7 is an explanatory diagram showing contents of a management file stored in the hard disc employed in the recording/playback apparatus implemented by the embodiment of the present invention;

FIG. 8 is an explanatory diagram showing the structure of a data base used in the embodiment of the present invention;

FIG. 11 is an explanatory diagram showing a typical displayed screen provided by the embodiment of the present invention for entering a bar code;

FIG. 12 is an explanatory diagram showing a typical displayed screen provided by the embodiment of the present invention for entering a bar code wherein a bar code has already been entered;

FIG. 15 is an explanatory diagram showing a typical displayed screen provided by the embodiment of the present invention to show second additional information obtained as a result of a search operation; and FIG. 16 shows a flowchart representing third typical processing carried out by the embodiment of the present invention.

DESCRIPTION OF THE PREFERRED EMBODIMENT

The following description explains a recording/playback apparatus implemented by an embodiment of the present invention by referring to diagrams. The description begins with an explanation of a typical system built by using the recording/playback apparatus. Then, typical characteristic operations of the recording/playback apparatus are enlightened.

It should be noted that the typical characteristic operations of the recording/playback apparatus provided by this embodiment can be implemented as operations of an information distributing system to be described later. However, the typical characteristic operations can also be implemented as operations of a standalone recording/playback apparatus.

Figure 1:
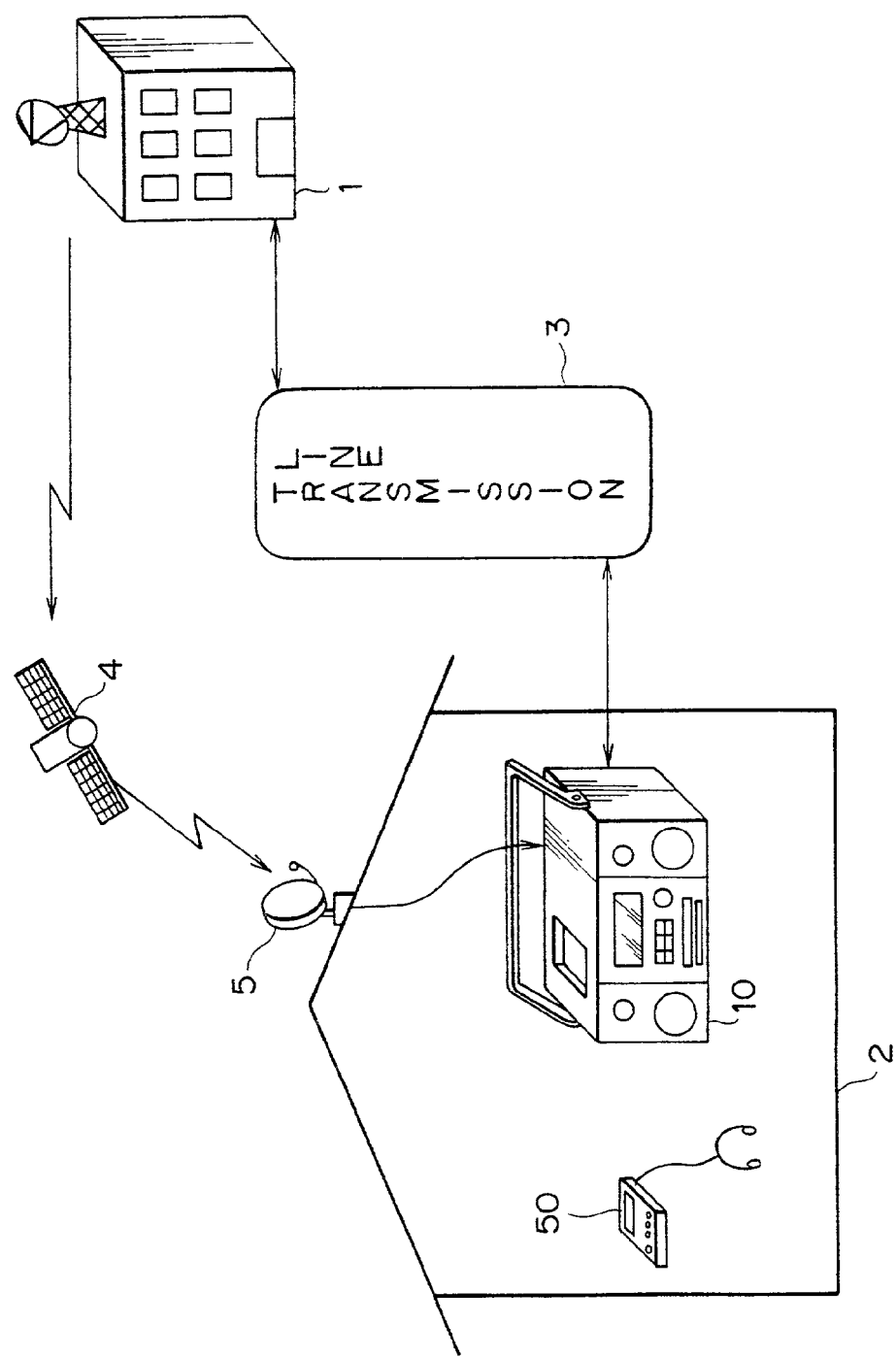
FIG. 1 is an explanatory diagram showing an information distributing system including a recording/playback apparatus implemented by an embodiment of the present invention.

The description is presented in the following order:

1. Overview of the Information Distributing System
2. Typical External Appearances of the Recording/Playback Apparatus and the Portable Apparatus
3. Internal Configuration of the Recording/Playback Apparatus
4. Internal Configuration of the Portable Apparatus
5. File Transfer Processing
6. File Storing in the Recording/Playback Apparatus
7. First Typical Operation to Dub Data from a CD to an HDD
8. Second Typical Operation to Dub Data from a CD to an HDD 1. Overview of the Information Distributing System FIG. 1 is a diagram showing an information distributing system including the recording/playback apparatus implemented by the embodiment in a simple and plain manner.

As shown in the figure, the information distributing system comprises a recording/playback apparatus 10 used by the general user typically at a home 2 and an information center 1 serving as an information service organization for providing information on the use of the recording/playback apparatus 10.

The recording/playback apparatus 10 and the information center 1 are capable of exchanging various kinds of information by way of transmission line 3 which is typically implemented by a public line network such as an ISDN (Integrated Services Digital Network) line or built as a line network dedicated to the information distributing system like a CATV (Cable Television) or wireless communication. Communication to implement the transmission line 3 is not specially prescribed.

As an alternative, the recording/playback apparatus 10 and the information center 1 may also exchange various kinds of information by way of a satellite transmission line utilizing a communication satellite 4 and a parabola antenna 5 installed at the home 2.

Described in detail later, the internal configuration of the present recording/playback apparatus 10 used by the general user includes a data-file storage unit having a large storage capacity. The data-file storage unit is implemented typically by a hard disc drive 15 shown in FIG. 3. The recording/playback apparatus 10 is also provided with, among others, a facility for driving package media such as an optical disc, an optical magnetic disc, a magnetic disc or a semiconductor memory, a function to input data from other equipment and a function to input data from the transmission line 3. The recording/playback apparatus 10 is capable of storing various kinds of data as files. The data stored as files may be audio data, image data, video data, text data or various other kinds of data played back from media such as an optical disc, an optical magnetic disc, a magnetic disc or a semiconductor memory purchased by the user, or various kinds of data input from other equipment or the transmission line 3.

Data stored as a file can be played back by the user arbitrarily. Typically, a piece of music which is treated as a music unit is stored as a file. Thus, once the user owning a number of CDs has stored each piece of music recorded on all the CDs into the recording/playback apparatus 10 as a file, the user no longer has to take the trouble to search the recording media for a CD containing a desired piece of music or the like and mount the CD on the recording/playback apparatus 10 in order to play back the desired piece of music or the like.

The information center 1 is capable of providing the recording/playback apparatus 10 with various kinds of information either for free or as a fee charging service.

For example, as additional information or information related to a file containing typically a piece of music stored in the recording/playback apparatus 10, the information center 1 may provide data such as the title of the song, the name of the artist, a text of typically the libretto, pictures representing typically an image of the music, a photograph of the artist or a picture displayed on the jacket, the address (the URL: Uniform Resource Locator) of the Internet home page for the artist, information on a copyright and names of relevant people like the libretto writer, the song composer and the producer. Typically, the recording/playback apparatus 10 stores these pieces of information supplied by the information center 1 by associating the information with the file for storing the piece of music. The information can be subjected later to a variety of operations such as an operation to output it to a display unit.

In this embodiment, additional information is obtained by the recording/playback apparatus 10 from the information center 1 as described above. It should be noted, however, that additional information can also be obtained from a source other than the information center 1.

In either case, a data base is required for storing pieces of additional information each associated typically with an album or a piece of music stored in the recording/playback apparatus 10. The data base can be searched for a piece of additional information associated with an album or a piece of music specified by the recording/playback apparatus 10 as will be described later. In this embodiment, additional information is obtained by the recording/playback apparatus 10 from such a data base.

Thus, if the information center 1 employed in the information distributing system has a data base, the recording/playback apparatus 10 provides the information center 1 with a search key. In return, the information center 1 supplies additional information associated with the search key to the recording/playback apparatus 10 as a search result as described above.

If the user has the data base stored typically on a CD-ROM at hand, on the other hand, the recording/playback apparatus 10 is capable of searching the CD-ROM for a desired piece of additional information. Of course, if the data base has been installed on the hard disc embedded in the recording/playback apparatus 10, the recording/playback apparatus 10 is capable of searching the data base for a desired piece of additional information. In the case of a data base installed in a CD-ROM or a hard disc, it is not necessary for the recording/playback apparatus 10 to communicate with the information center 1 in order to obtain additional information. That is to say, the recording/playback apparatus 10 is capable of operating as the so-called standalone piece of equipment to search the data base for a desired piece of additional information without being connected to an information distributing system like the recording/playback apparatus 10 shown in FIG. 1 as implemented by the embodiment to be described later.

In this typical information distributing system, there is also provided a portable recording/playback apparatus 50 as an apparatus that can be utilized by the user. Referred to hereafter simply as a portable apparatus 50, the portable recording/playback apparatus 50 can be connected to the recording/playback apparatus 10.

Figure 4:
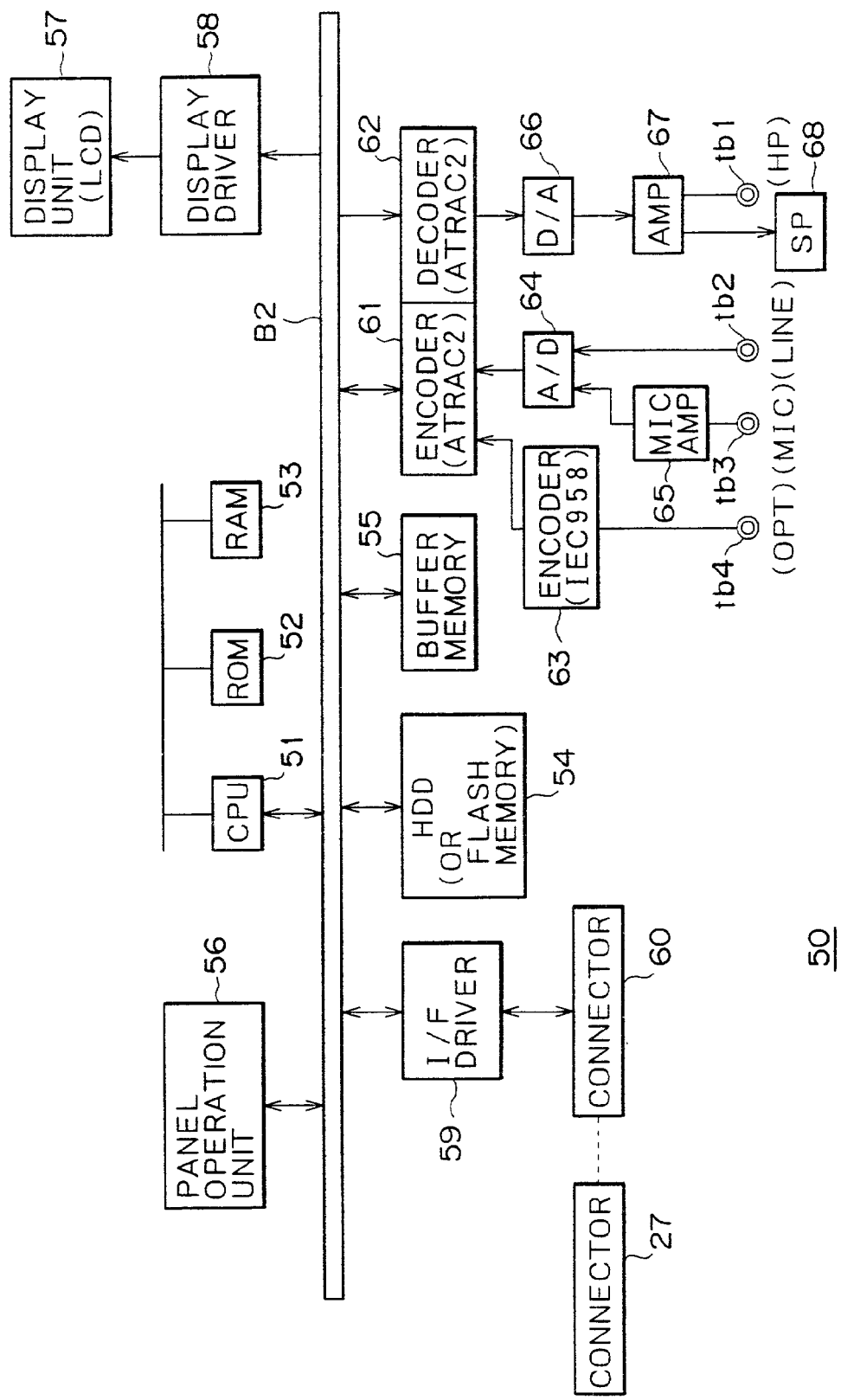
FIG. 4 is a block diagram showing the portable apparatus implemented by the embodiment of the present invention.

The internal configuration of the portable apparatus 50 includes a data-file storage unit 54 for storing files of typically audio data as will be described later in detail. The data-file storage unit 54 is implemented by typically a hard disc drive or a flash memory as shown in FIG. 4.

When the portable apparatus 50 is connected to the recording/playback apparatus 10 in this system, a file containing typically a piece of music stored in the recording/playback apparatus 10 can be copied or transferred to the data-file storage unit 54 embedded in the portable apparatus 50. Of course, in this system, a file stored in the data-file storage unit 54 employed in the portable apparatus 50 can be reversely copied or transferred to the data-file storage unit embedded in the recording/playback apparatus 10.

If the user transfers or copies any arbitrary file selected from those stored in the recording/playback apparatus 10 to the portable apparatus 50, the user will be capable of utilizing the selected file by means of the portable apparatus 50. Typically, the user selects files of pieces of music to be listened to on a trip day. On that day, the user is thus capable of listening to the music from the portable apparatus 50.

Figure 2:
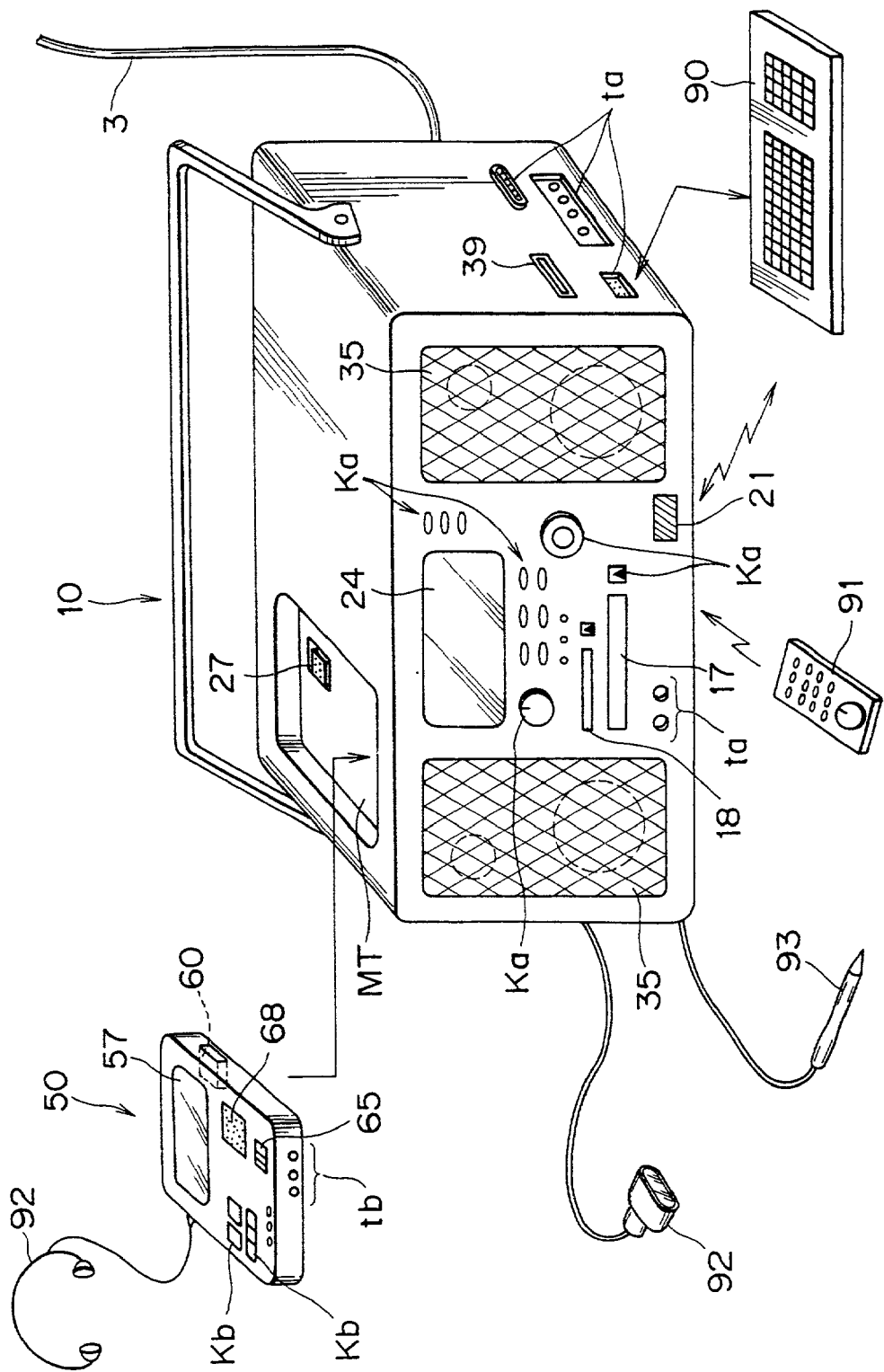
FIG. 2 is an explanatory diagram showing a portable apparatus and the recording/playback apparatus implemented by the embodiment of the present invention.

2. Typical External Appearances of the Recording/Playback Apparatus and the Portable Apparatus FIG. 2 is a diagram showing external appearances of the recording/playback apparatus 10 and the portable apparatus 50. It should be noted that what is described below is no more than examples. That is to say, it is possible to modify the external appearances, the user-interface configurations and the connections of the recording/playback apparatus 10 and the portable apparatus 50. By the user-interface configuration, the configurations of operation and display units are meant.

As shown in FIG. 2, the recording/playback apparatus 10 is typically implemented as the so-called radio-cassette equipment which can be utilized by the user at home. Of course, the recording/playback apparatus 10 can also be implemented as a component type.

Typically on the equipment front panel of the recording/playback apparatus 10, there are provided a variety of operators Ka to be operated by the user to carry out a variety of operations. The operators Ka include operation keys, operation buttons and a rotation/push key known as a jog dial.

As output members for presenting outputs to the user, the recording/playback apparatus 10 includes a speaker 35 for outputting typically reproduced sounds and a display unit 24 for displaying various kinds of information. The display unit 24 is typically implemented by a liquid-crystal panel.

The recording/playback apparatus 10 also has an optical-disc insertion unit 17 into which an optical disc owned by the user is inserted. Data recorded on the optical disc is played back or dubbed to a hard disc embedded in the recording/playback apparatus 10 to be described later. Examples of the optical disc are an audio CD, a CD-ROM and a CD text.

By the same token, the recording/playback apparatus 10 also has an optical-magnetic-disc insertion unit 18 into which an optical magnetic disc owned by the user is inserted. Data is recorded onto the optical magnetic disc, and data recorded on the optical magnetic disc is played back or dubbed to the hard disc embedded in the recording/playback apparatus 10 to be described later. Examples of the optical magnetic disc are an audio MD and an MD data.

The recording/playback apparatus 10 is also provided with a variety of terminals ta for connection with external equipment. The terminals ta include members for connection with a microphone and a headphone, line connection terminals for connection with equipment such as another audio visual apparatus and a personal computer, an optical digital connection terminal and an interface connector.

In addition, as a user operation input means of the recording/playback apparatus 10, a keyboard 90 and a remote commander 91 can also be used besides the operators Ka cited above.

Normally, the keyboard 90 is connected to one of the terminals ta which serves as a keyboard connector. As an alternative, the keyboard 90 may include an infrared-ray transmitting unit. In this case, information on an operation carried out on the keyboard 90 is output by the keyboard 90 as an infrared ray which is received by a light receiving unit 21 employed in the recording/playback apparatus 10 and supplied to the recording/playback apparatus 10.

The remote commander 91 outputs operation information to the light receiving unit 21 typically as an infrared ray signal. The light receiving unit 21 supplies the infrared ray conveying the operation information to the recording/playback apparatus 10.

It should be noted that information on an operation carried out on a keyboard 90 of the radio type and information on an operation carried out on the remote commander 91 can each be output as a radio wave instead of an infrared ray.

The recording/playback apparatus 10 is also provided with an input pen 93 which serves as an input means in conjunction with the display unit 24. To put it in detail, the display unit 24 displays a picture serving as the so-called GUI (Graphical User Interface) for carrying out input operations. When the input pen 93 is brought into contact with the picture appearing on the display unit 24, an operation corresponding to the portion of the picture touched by the input pen 93 is sensed and an input representing the operation is supplied to the recording/display apparatus 10.

In addition, a bar-code scanner 92 is also provided as an input means. The bar-code scanner 92 is capable of reading a bar code displayed typically on the package of a CD or the jacket of an album.

The recording/playback apparatus 10 also includes a PCMCIA slot 39 onto which a PCMCIA card is plugged so that data can be exchanged between the recording/playback apparatus 10 and the PCMCIA card.

The portable apparatus 50 is designed into a properly small size and a properly small weight so that the user can carry and use it.

The portable apparatus 50 has a variety of operators Kb to be operated by the user for entering a variety of inputs. Of course, as an operator Kb, the portable apparatus 50 can also be provided with a jog dial which is not shown in the figure.

As output members for presenting outputs to the user, the portable apparatus 50 includes a speaker 68 for outputting typically reproduced sounds and a display unit 57 for displaying and outputting various kinds of information. The display unit 57 is typically implemented by a liquid-crystal panel.

The portable apparatus 50 is also provided with a variety of terminals tb for connection with external equipment. The terminals tb include members for connection with a microphone and a headphone, line connection terminals for connection with equipment such as another audio visual apparatus and a personal computer, an optical digital connection terminal and an interface connector.

When the user wants to listen to music or the like from the portable apparatus 50 carried by the user, the music or the like is played back and output by the speaker 68. As an alternative, the user connects a headphone 92 to one of the terminals tb serving as a headphone terminal and listens to the reproduced music or the like through the headphone 92.

With the portable apparatus 50 connected to the recording/playback apparatus 10, various kinds of data can be communicated between the portable apparatus 50 connected to the recording/playback apparatus 10. The communicated data includes true file data like audio data and control data used for processing the true file data during the communication.

In this embodiment, the recording/playback apparatus 10 includes a mounting unit MT having a connector 27. When the portable apparatus 50 is mounted on this mounting unit MT, the portable apparatus 50 is connected to the recording/playback apparatus 10. To put it in detail, when the portable apparatus 50 is mounted on this mounting unit MT, a connector 60 on the lower portion of the portable apparatus 50 is engaged with the connector 27 in the mounting unit MT of the recording/playback apparatus 10. In this state, data is communicated between the portable apparatus 50 and the recording/playback apparatus 10 by way of the connectors 60 and 27.

It should be noted that the recording/playback apparatus 10 and the portable apparatus 50 can also be connected to each other by adoption of a line connection system using a communication cable or adoption of a radio connection system utilizing typically an infrared ray.

3. Internal Configuration of the Recording/Playback Apparatus

Figure 3:
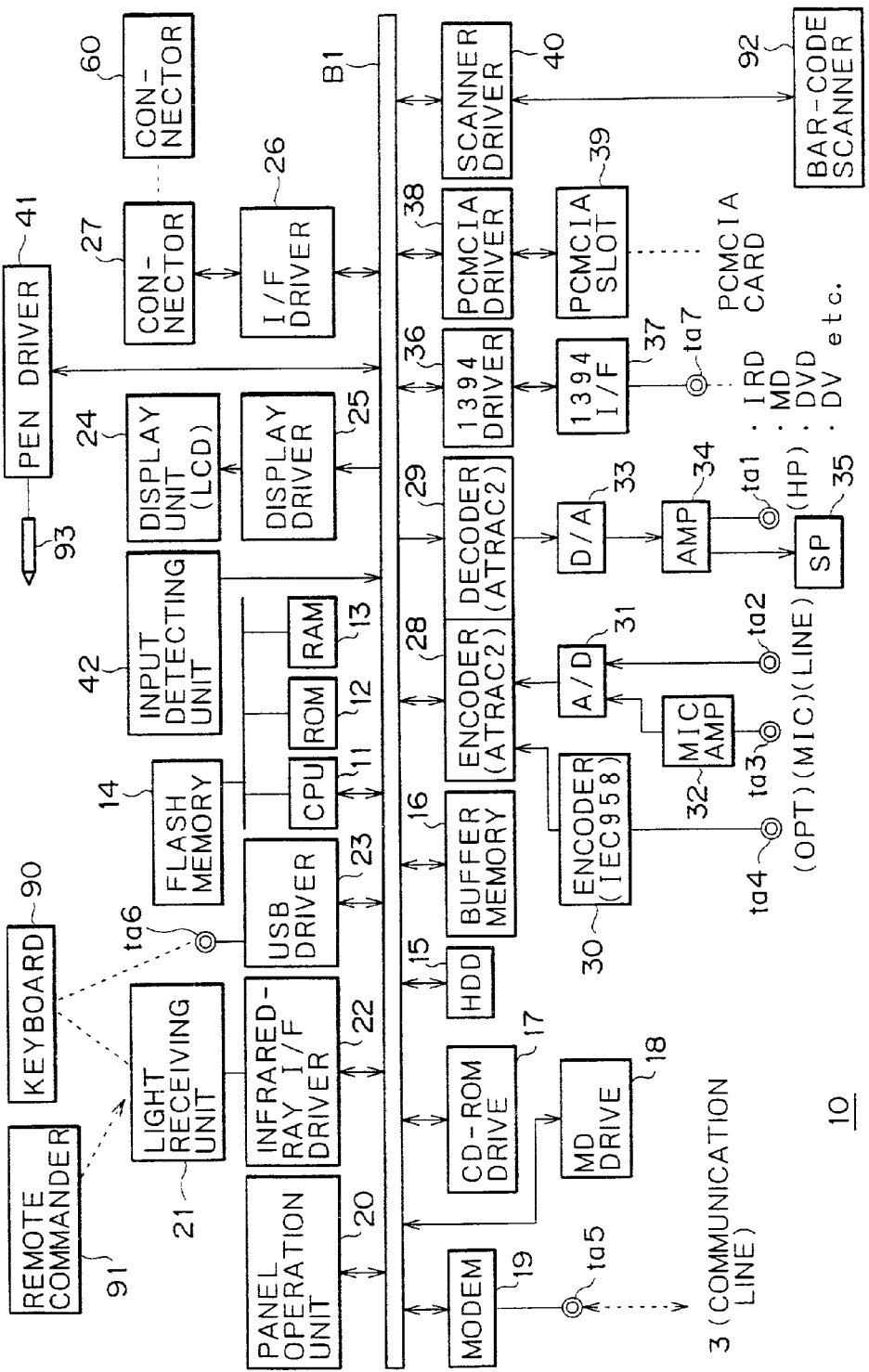
FIG. 3 is a block diagram showing the recording/playback apparatus implemented by the embodiment of the present invention.

FIG. 3 is a diagram showing a typical internal configuration of the recording/playback apparatus 10.

A panel operation unit 20 of the recording/playback apparatus 10 includes operators of the push and rotary types. The operators correspond to the variety of operators Ka shown in FIG. 2. That is to say, they are a variety of operators provided on the case of the recording/playback apparatus 10.

When the panel operation unit 20 is operated by the user, the unit 20 generates an operation signal driving the recording/playback apparatus 10 to carry out one of a variety of operations. Driven by the operation signal, the recording/playback apparatus 10 carries out one the operations.

As described earlier, an input is supplied to the recording/playback apparatus 10 when the input pen 93 shown in FIG. 2 is brought into contact with an operation key display appearing on the display unit 24. An input detecting unit 42 is provided to detect contact of the input pen 93 with the operation key display. There is also provided a pen driver 41 for driving the input pen 93.

As an input system based on the input pen 93, static-capacitance detection is typically adopted. To put it in detail, an electrode is provided at the tip of the input pen 93 which is driven by the pen driver 41. The input detecting unit 42 is implemented by electrodes laid out as a matrix in a range corresponding to the display surface of the display unit 24. A position on the display surface of the display unit 24 touched by the pen driver 41 is detected as a location with an electrostatic capacitance changed by the electrode at the node in the matrix. The operation is then determined to be an input representing an operation picture displayed at the location.

As another example, there is a conceivable configuration in which the input detecting unit 42 is implemented by switch electrodes laid out to form a 2-layer matrix. When the input pen 93 is brought into contact with a position on the matrix, mechanical contact of the switch electrode at that position is detected. In the case of such a mechanical configuration, the pen driver 41 is not required. In addition, the input pen 93 does not have to be a pen dedicated to the input system.

The bar code scanner 92 shown in FIG. 2 is driven by a scanner driver 40 to fetch bar-code data.

The keyboard 90 and the remote commander 91 cited earlier are utilized to facilitate an operation to enter information such as the title of a song or the name of an artist for typically recorded audio data. It should be noted that the keyboard 90 for entering inputs can also be connected to a USB (Universal Serial Bus) terminal ta6 for example. In this case, an input signal or an operation signal entered by the user via the keyboard 90 is supplied to a USB driver by way of the USB terminal ta6 to be fetched into the recording/playback apparatus 10. It should be noted that a variety of terminals ta1 to ta7 shown in FIG. 3 each correspond to one of the terminals ta shown in FIG. 2.

An infrared signal generated by the remote commander 91 or by the infrared-ray transmitting unit employed in the keyboard 90 to serve as an operation signal is converted by the light receiving unit 21 into an electrical signal which is then supplied to an infrared-ray interface driver 22. In this way, the operation signal is fetched into the recording/playback apparatus 10.

It should be noted that it is possible to have a configuration wherein data is transferred and output from the recording/playback apparatus 10 to external equipment by way of the infrared-ray interface driver 22 or the USB driver 23.

The recording/playback apparatus 10 has the same configuration as a personal computer. Much like a personal computer, the recording/playback apparatus 10 also comprises a RAM 13, a ROM 12, a flash memory 14 and a CPU 11 for controlling the whole operation of the recording/playback apparatus 10.

File data and control data are exchanged among blocks by way of a bus B1.

An operation input signal input by the user by the input means such as the panel operation unit 20, the input pen 93, the bar-code scanner 92, the remote commander 91 and the keyboard 90 is supplied to the CPU 11 which then carries out predetermined processing in accordance with the operation signal representing an operation carried out by the user on the input means.

The ROM 12 is used for storing a program to be executed by the CPU 11 to control the operation of the recording/playback apparatus 10 in accordance with an input signal representing an operation carried out by the user on the panel operation unit 20 or the other input means.

The RAM 13 and the flash memory 14 serve as a temporary data area and a temporary task area used during the execution of the program. A program loader is also stored in the ROM 12. The program loader loads the program itself into the RAM 13 or the flash memory 14.

A CD-ROM drive 17 reads out data at a 1-time speed or a speed higher than the 1-time speed such as a 16-time speed or a 32-time speed by using an optical pickup from an optical disc such as an audio CD, a CD-ROM and a CD text inserted into the optical-disc insertion unit 17.

An MD drive 18 reads out information by using an optical pickup from an optical disc or an optical magnetic disc such as an audio MD or MD data inserted into the optical-magnetic-disc insertion unit 18. The MD drive 18 also records information onto a mounted disc.

In this embodiment, both the CD-ROM drive 17 and the MD drive 18 are employed. It should be noted, however, that only one of them or a drive for handling other kinds of information recording media can be employed. The other kinds of recording media include an optical magnetic disc called an MO disc, an optical disc of another type, a magnetic disc and a non-volatile memory card.

As a large-capacity storage means embedded in the recording/playback apparatus 10, there is provided a hard disc drive 15 for recording and playing back information onto and from a hard disc. The hard disc drive 15 is referred to hereafter simply as an HDD. Audio information read out from the CD-ROM drive 17 or an MD drive 18 is stored in the HDD 15 as files. Typically, a piece of music is treated as a unit and stored as a file.

The recording/playback apparatus 10 also includes an encoder 28 for carrying out a compression encoding process on audio data in accordance with an ATRAC2 (Adaptive Transform Acoustic Coding 2) system. The recording/playback apparatus 10 also includes a decoder 29 for carrying out a decoding process on audio data. The decoding process is a process inverse to the compression encoding process according to the ATRAC2 system.

The encoder 28 and the decoder 29 carry out the encoding and decoding processes respectively under control executed by the CPU 11.

In addition, the recording/playback apparatus 10 implemented by this embodiment also includes a buffer memory 16 for temporarily storing audio data to be processed. Data is written into and read out from the buffer memory 16 also under control executed by the CPU 11.

Assume for example that audio data read out from a disc in the CD-ROM drive 17 under control executed by the CPU 11 is stored in the HDD 15. In this case, as preprocessing to store the audio data read out from the disc into the HDD15, the audio data is temporarily stored into the buffer memory 16 and supplied from the buffer memory 16 to the encoder 28 to be encoded in accordance with the ATRAC2 system. The audio data encoded by the encoder 28 is then stored back into the buffer memory 16 temporarily before being finally stored into the HDD 15.

As described above, in this embodiment, it is audio data encoded by the encoder 28 in accordance with the ATRAC2 system that is stored into the HDD 15. It should be noted, however, that data read out from for example the CD-ROM drive 17 can also be stored into the HDD 15 as PCM (Pulse Code Modulation) data.

The encoder 28 is used for encoding not only data read out from a media mounted on the CD-ROM drive 17, but also audio data supplied from a line-input terminal ta2 and a microphone terminal ta3. To put it in detail, the encoder 28 also encodes audio data output by an A/D converter 31 which receives an audio signal supplied by a microphone connected to a microphone terminal ta3 by way of an amplifier 32 or an audio signal supplied from an apparatus such as another CD player connected to a line-input terminal ta2.

In addition, data supplied by another external apparatus such as a CD player connected to an optical digital terminal ta4 by way of an IEC958 (International Electrotechnical Commission 958) encoder 30 can also be supplied to the encoder 28. In this way, data supplied by an optical digital system can also be encoded by the encoder 28 like the IEC 958.

Data supplied by an external apparatus is encoded by the encoder 28 as described above before being stored into the HDD 15 as files.

As described above, the ATRAC2 (trademark) system is adopted as an encoding algorithm in the encoder 28. It should be noted, however, that the encoding algorithm is not restricted to ATRAC2. That is to say, any encoding algorithm can be adopted as long as the algorithm compresses information. Other encoding algorithms for compressing information include ATRAC (trademark), ATRAC3 (trademark), MPEG (Moving Picture Coding Experts Group), PASC (Precision Adaptive Sub-band Coding), TwinVQ (Transform-Domain Weighted Interleave Vector Quantization, a trademark), RealAudio (trademark) and LiquidAudio (trademark).

The recording/playback apparatus 10 includes a modem 19 connected to the transmission line 3 through a communication terminal ta5. The transmission line 3 is an external network which can be implemented by the Internet, a telephone network, a cable-TV network, a wireless network or the ISDN (Integrated Services Digital Network). The modem 19 serves as an interface connectable to the transmission line 3.

A variety of signals are transmitted to a remote server by way of the modem 19 under control executed by the CPU 11. The signals transmitted by way of the modem 19 include a request signal demanding some services, information on a media mounted on the CD-ROM drive 17, a user ID, user information and user accounting information.

The server connected to the external network, that is, a server which is capable of communicating with the transmission line 3, carries out processing to collate a user ID, accounting, processing to search for music additional information associated with information on media. Examples of the additional information are the title of a song, the name of an artist, the name of a music composer, the name of a song writer, a libretto and a jacket picture. Thus, the server connected to the external network transmits predetermined additional information requested by the user to the recording/playback apparatus 10.

In the above example, additional information related to music is transmitted by the server connected to the external network to the recording/playback apparatus 10 after collating a user ID and completing accounting. It should be noted that information on music requested by the user can also be loaded from the external network without collation of a user ID and carrying out processing. In addition, there can also be provided a system wherein information on music is transmitted to the recording/playback apparatus 10 in response to information on media and a bonus track is distributed for predetermined media.

In a playback operation, audio information stored in the HDD 15 is decoded by the decoder 29 and output to the speaker 35 or a headphone connected to a headphone terminal ta1 by way of a D/A converter 33 and an amplifier 34 under control executed by the CPU 11.

In this embodiment, the decoder 29 decodes data in accordance with the ATRAC2 system. It should be noted that another decoding algorithm can also be adopted as long as the other algorithm is compatible with an encoding algorithm embraced by the encoder 28.

The encoding and decoding processes can also be carried out by software executed by the CPU 11 instead of the hardware.

Furthermore, as shown in FIG. 2, the recording/playback apparatus 10 includes the display unit 24 serving as an interface which allows the user to administer and control files of typically audio data stored in the HDD 15. The display unit 24 is driven by a display driver 25.

The display unit 24 displays necessary information such as characters, symbols and operation icons under control executed by the CPU 11.

In addition, the display unit 24 also displays a jacket image or a folder of typically audio files to be specified by using a pointing device such as the input pen 93 described earlier. It should be noted that an audio file used in the following description is a file in which audio data of typically a piece of music is stored. For example, the recording/playback apparatus 10 plays back a piece of music, the audio data of which is stored in an audio file specified by the user.

Of course, as a conceivable alternative, an audio file can also be specified by clicking a mouse or touching the file with a finger of the user.

In addition, a specified audio file displayed on the display unit 24 can also be specified to be deleted or to be copied/transferred to an external apparatus such as the portable apparatus 50 in accordance with an operation carried out by the user on the display.

The display unit 24 is designed into a configuration capable of displaying an html (hyper text markup language) text representing related information as a graphic and capable of operating as an ordinary Internet browser. The related information is received from a WWW (world wide web) site as a result of a search based on TOC (Table of Contents) information of a media mounted on the CD-ROM drive 17.

The recording/playback apparatus 10 is also capable of inputting audio data from various kinds of equipment or a variety of systems connected to a terminal ta7 through an IEEE1394 interface 37 and an IEEE1394 driver 36. Examples of such equipment and systems are a satellite broadcasting IRD (Integrated Receiver/Decoder), an MD player, a DVD (Digital Video Disc) player and a DV (Digital Video) player.

As a further additional function, the recording/playback apparatus 10 is provided with a PCMCIA (Personal Computer Memory Card International Association) slot 39 connected to a PCMCIA driver 38. A PCMCIA card can be plugged into and removed from the PCMCIA slot 39 so that the recording/playback apparatus 10 can be easily extended to various kinds of peripheral equipment such as an external storage apparatus, another media drive, a modem, a terminal adapter and a capture board through the PCMA card.

As explained earlier by referring to FIG. 2, the recording/playback apparatus 10 has a connector 27 for connecting the portable apparatus 50 to the recording/playback apparatus 10. By connecting the connector 27 to the connector 60 on the portable apparatus 50, under control executed by the CPU 11, the recording/playback apparatus 10 is capable of communicating various kinds of data with the portable apparatus 50 through an interface driver 26. For example, an audio file stored in the HDD 15 can be transferred to the portable apparatus 50.

4. Internal Configuration of the Portable Apparatus

FIG. 4 is a diagram showing a typical internal configuration of the portable apparatus 50.

When the connector 27 is engaged with the connector 60, the recording/playback apparatus 10 is electrically connected to the portable apparatus 50. The interface driver 26 employed in the recording/playback apparatus 10 is connected to an interface driver 59 employed in the portable apparatus 50, allowing data to be communicated between the recording/playback apparatus 10 and the portable apparatus 50.

The panel operation unit 56 employed in the portable unit 50 includes keys of the push and rotary types. That is to say, a variety of operators Kb shown in FIG. 2 correspond to the panel operation unit 56. When an operator Kb of the panel operation unit 56 is operated by the user, an operation signal requesting an operation of the portable apparatus 50 is output to a control bus B2. The portable apparatus 50 then carries out the operation requested by the operation signal.

Much like the recording/playback apparatus 10, the portable apparatus 50 has the same configuration as a personal computer. That is to say, the portable apparatus 50 comprises a RAM 53, a ROM 52 and a CPU 51 for controlling the whole operation of the portable apparatus 50. File data and control data are exchanged among blocks in the portable apparatus 50 by way of the bus B2.

The ROM 52 is used for storing a program to be executed by the CPU 51 to control the operation of the portable apparatus 50 in accordance with an input signal representing an operation carried out by the user on the panel operation unit 56. The RAM 53 serves as a temporary data area and a temporary task area used during the execution of the program cited earlier. A flash memory can also be employed like the recording/playback apparatus 10 and the configuration of the portable apparatus 50 does not have to be based on a bus.

As a storage means embedded in the portable apparatus 50, there is provided an HDD (hard disc drive) 54 for recording and playing back information onto and from a hard disc. For example, audio information transferred from the recording/playback apparatus 10 is stored in the HDD 54 as files. Typically, a piece of music is stored as a unit. It should be noted that typically a flash memory can also be employed as the storage means in place of the HDD.

Much like the recording/playback apparatus 10, the portable apparatus 50 also includes an encoder 61 for carrying out a compression encoding process on audio data in accordance with the ATRAC2 system. The portable apparatus 50 also includes a decoder 62 for carrying out a decoding process on audio data in accordance with the ATRAC2 system.

The encoder 61 and the decoder 62 carry out the encoding and decoding processes respectively under control executed by the CPU 51.

The portable apparatus 50 implemented by the embodiment also includes a buffer memory 55 for temporarily storing audio data to be processed. Data is written into and read out from the buffer memory 55 also under control executed by the CPU 51.

Assume for example that audio data not encoded in accordance with the ATRAC2 system is supplied by the recording/playback apparatus 10 by way of the interface driver 59 and stored in the HDD 54 under control executed by the CPU 51. In this case, as preprocessing to store the audio data into the HDD 54 in the portable apparatus 50, the audio data is temporarily stored into the buffer memory 55 and the audio data is supplied from the buffer memory to the encoder 61 to be encoded in accordance with the ATRAC2 system. The audio data encoded by the encoder 61 is then stored back into the buffer memory 55 temporarily before being finally stored into the HDD 54.

It should be noted that, as described earlier, in this embodiment, the HDD 15 employed in the recording/playback apparatus 10 is used for storing typically audio files which have been encoded in accordance with the ATRAC2 system. Thus, when an audio file of a piece of music stored in the HDD 15 can be supplied to the interface driver 59 to be stored in the HDD 54 employed in the portable apparatus 50 in an operation to copy or transfer the file, the processing carried out by the encoder 61 is not required. However, PCM audio data may be supplied to the interface driver 59 directly from a media mounted typically on the CD-ROM drive 17 employed in the recording/playback apparatus 10. Since such PCM audio data has not been compressed, the audio data needs to-be encoded by the encoder 61 before being recorded into the HDD 54.

As described above, in this embodiment, it is audio data encoded by the encoder 61 in accordance with the ATRAC2 system that is stored into the HDD 54. It should be noted, however, that uncompressed data can also be stored into the HDD 54 as it is.

Mean supplying audio data to the encoder 61 for compressing the audio data include a microphone terminal tb3, a line input terminal tb2 and an optical digital terminal tb4 besides the interface driver 59. It should be noted that the terminals tb1 to tb4 shown in FIG. 4 each correspond to one of the terminals tb shown in FIG. 2.

The encoder 61 is used for encoding also audio data received from the line input terminal tb2 or the microphone terminal tb3. To put it in detail, the encoder 61 encodes also audio data output by an A/D converter 64 which receives an audio signal supplied by a microphone connected to the microphone terminal tb3 by way of an amplifier 65 or an audio signal supplied from an apparatus such as another CD player connected to a line-input terminal tb2. The audio data input from tb3 and tb2 can be encoded by the encoder 28.

In addition, data supplied by another external apparatus such as a CD player connected to an optical digital terminal tb4 by way of an IEC958 encoder 63 can also be supplied to the encoder 61. In this way, data supplied by an optical digital system can also be encoded by the encoder 61 like the IEC 958.

Data supplied by an external apparatus is encoded by the encoder 61 as described above before being stored into the HDD 54 as files.

As described above, the ATRAC2 system is adopted as an encoding algorithm in the encoder 61. It should be noted, however, that any encoding algorithm can be adopted as long as the algorithm compresses information. Other encoding algorithms for compressing information include ATRAC, ATRAC3, MPEG, PASC, TwinVQ, RealAudio and LiquidAudio.

In a playback operation, audio information stored in the HDD 54 is decoded by the decoder 62 and output to the speaker 68 or a headphone connected to a headphone terminal tb1 by way of a D/A converter 66 and an amplifier 67 under control executed by the CPU 51.

In this embodiment, the decoder 62 decodes data in accordance with the ATRAC2 system. It should be noted that another decoding algorithm can also be adopted as long as the other algorithm is compatible with an encoding algorithm embraced by the encoder 61.

The encoding and decoding processes can also be carried out by software executed by the CPU 51 instead of the hardware.

Furthermore, as shown in FIG. 2, the portable apparatus 50 includes the display unit 57 serving as an interface which allows the user to administer and control files of typically audio data stored in the HDD 54. The display unit 57 is driven by a display driver 58.

The display unit 57 displays necessary information such as characters, symbols and operation icons under control executed by the CPU 51.

The display unit 57 also displays a jacket image or a folder of typically audio files to be specified by carrying out an operation on the display unit 57 by using a mouse or by a touch using a pen or a finger of the user. The operation may correspond to an operation carried out on the panel operation unit 20. For example, the portable apparatus 50 plays back a piece of music, the audio data of which is stored in the HDD 54 as an audio file specified by the user, and outputs the reproduced music to the speaker 35.

In addition, a specified audio file displayed on the display unit 57 can also be specified from those stored in the HDD 54 to be deleted from the HDD 54 or to be copied/transferred to an external apparatus such as the recording/playback apparatus 10 by an operation carried out by the user.

As explained earlier by referring to FIG. 2, by mounting the portable apparatus 50 on the mounting unit MT of the recording/playback apparatus 10, it is possible to have data exchanged between the recording/playback apparatus 10 and the portable apparatus 50. It should be noted, however, that a non-contact interface such as an IrDA can also be adopted.

In addition, the recording/playback apparatus 10 is also provided with a charging-current supplying device which is shown in none of the figure. The charging-current supplying device supplies a charging current to the portable apparatus 50 mounted on the recording/playback apparatus 10, charging a rechargable battery which serves as a power supply for the operation of the portable apparatus 50.

5. File Transfer Processing

In the recording/playback apparatus 10 and the portable apparatus 50 with the configurations described above, stored files such as audio data of music can be copied or transferred from the recording/playback apparatus 10 to the portable apparatus 50 and vice versa.

To put it in detail, a file stored in the HDD 15 employed in the recording/playback apparatus 10 is copied or transferred to the HDD 54 employed in the portable apparatus 50. Reversely, a file stored in the HDD 54 employed in the portable apparatus 50 is copied or transferred to the HDD 15 employed in the recording/playback apparatus 10.

When a file is copied from a source HDD to a destination HDD, the file remains in the source HDD and the same file is also stored on the destination HDD. That is to say, the file can be played back from either the recording/playback apparatus 10 or the portable apparatus 50. When a file is transferred from a source HDD to a destination HDD, on the other hand, the file does not remain in the source HDD even though the same file is stored on the destination HDD. Thus, the file can be played back only from the destination HDD.

In this embodiment, an audio file can be transferred from the HDD 15 to the HDD 54 or vice versa.

Figure 5:
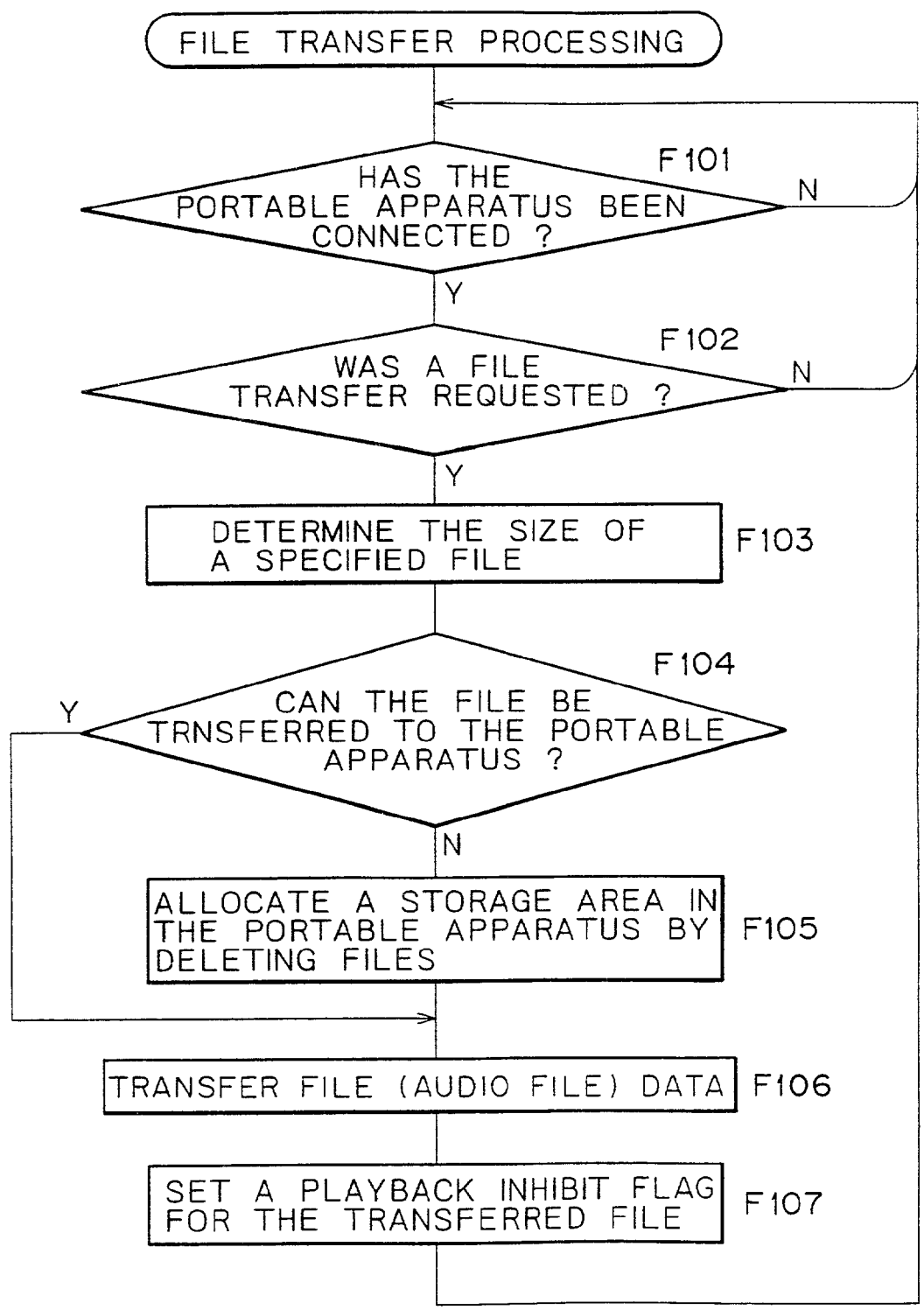
FIG. 5 shows a flowchart representing processing to transfer a file from the recording/playback apparatus to the portable apparatus as implemented by the embodiment of the present invention.

FIG. 5 shows a flowchart representing processing carried out by the CPU 11 to transfer a specified file stored on the HDD 15 employed in the recording/playback apparatus 10 to the HDD 54 employed in the portable 50.

At a step F101, the CPU 11 forms a judgment as to whether or not the portable apparatus 50 has been mounted on the mounting unit MT of the recording/playback apparatus 10. The judgment is based on a result of detection output by a detection means which is implemented typically by a mechanical-switch mechanism for detecting the mounting state of the portable apparatus 50, or a detection means for detecting connection such as typically transmission or reception of a signal through the connectors 27 and 60.

If the outcome of the judgment indicates that the portable apparatus 50 has not been mounted on the mounting unit MT of the recording/playback apparatus 10, the judgment to determine whether or not the portable apparatus 50 has been mounted on the mounting unit MT of the recording/playback apparatus 10 is repeated. As the outcome of the judgment indicates that the portable apparatus 50 has been mounted on the mounting unit MT of the recording/playback apparatus 10, the flow of the processing goes on to a step F102 to form a judgment as to whether or not the user or a program in execution has issued a request for a transfer of an audio file to the portable apparatus 50.

To put it concretely, for example, the user specifies an audio file to be transferred to the portable apparatus 50 by using a predetermined pointing device among those included in a folder of audio files displayed on the display unit 24.

If the outcome of the judgment formed at the step F102 indicates that there is a request for a transfer of a piece of music, the flow of the processing goes on to a step F103 at which the size of the specified audio file is determined.

The flow then proceeds to a step F104 at which the size of a free storage area in the HDD 54 employed in the portable apparatus 50 is determined and compared with the size of the audio file specified to be transferred to the portable apparatus 50.

The size of the free storage area in the HDD 54 is determined by a communication with the CPU 51. For example, a configuration may be provided to allow the CPU 11 to make a direct access to the HDD 54. With the CPU 11 capable of making a direct access to the HDD 54, the CPU 11 is also capable of determining the size of the free storage area in the HDD 54 directly since the operation of the HDD 54 and files stored therein can be controlled by the CPU 11.

If the size of the free storage area in the HDD 54 is found smaller than the size of the audio file to be transferred so that the specified audio file can not be transferred, the flow of the processing goes on to a step F105 at which some audio files stored in the HDD 54 are deleted. Such files may be deleted by the CPU 11 through the CPU 51 or directly.

As a conceivable technique to delete audio files from the HDD 54 or a conceivable technique to select audio files to be deleted, audio files to be deleted are put on a list on an order of increasing playback operations requested by the user in the past. Audio files are thus deleted starting with that on the top of the list with fewest requested playback operations. Since an audio file is thereby deleted automatically without a consent of the user, however, it is quite within the bounds of possibility that an audio file of importance to the user may be deleted. In order to solve this problem, before an audio file is deleted, a warning message can be displayed on the display unit 24 and/or the display unit 57 to let the user confirm the deletion.

If the result of the comparison made at the step F104 indicates that the specified audio file can be transferred, on the other hand, the flow of the processing continues to a step F106. If the result of the comparison made at the step F104 indicates that the specified audio file can not be transferred, the flow of the processing continues to the step F105 at which some audio files on the list are deleted as described above to allocate a sufficient storage area in the HDD 54. After processing of the step F105 is completed, the flow of the processing goes on to the step F106. At the step F106, the specified audio file is transferred from the HDD 15 to the HDD 54 by way of the interface drivers 26 and 59.

The flow of the processing then proceeds to a step F107 at which, for the specified audio file in the HDD 15, a flag to inhibit a playback operation is set because the file has been subjected to a transfer operation from the HDD 15 to the HDD 54. That is to say, in the HDD 15, the transferred audio file is treated as an unreproducible file even though the file is still physically recorded on the HDD 15. It should be noted that the transferred audio file can also be indeed deleted from the HDD 15 at the step F107. As the processing of the step F107 is completed, the flow of the processing goes back to the step F101 to repeat the processing starting from the step F101.

By setting a playback inhibit flag for the specified audio file at the step F107, the file is virtually moved from the recording/playback apparatus 10 to the portable apparatus 50. In this way, audio files are controlled so that there will be never a copy of an audio file. As a result, there is also exhibited an effect of prevention of an illegal copy.

Since the HDD 15 and the HDD 54 are both media which can be accessed at a high speed and a transfer of an audio file from the HDD 15 to the HDD 54 does not entail encoding and decoding processes according to typically the ATRAC2 system, the transfer of audio file is completed instantaneously. For example, processing to transfer audio files containing a plurality of pieces of music can be finished in a very short period of time. Thus, it does not take the user a long time to transfer audio files according to the present embodiment so that the user may select pieces of music in accordance with the condition and the mood of that day and transfer the music to the portable apparatus 50 with ease.

By carrying out the processing of FIG. 5 described above, an audio file can be transferred from the HDD 15 to the HDD 54.

Thus, the user typically selects desired pieces of music owned by the user, that is, files stored in the HDD 15, and the processing is carried out to allow the user to transfer the selected pieces of music to the HDD 54 employed in the portable apparatus 50. In this way, the user is capable of playing back the music the user wants to listen to at places other than the home.

In the case of a copy operation carried out by the CPU 11 through the CPU 51, the processing of the step F107 is not carried out.

While processing to reversely transfer or copy a file from the HDD 54 to the HDD 15 can be carried out by the CPU 51 in accordance with about the same following procedure, the CPU 11 can also serve as a main CPU to perform the processing.

6. File Storing in the Recording/Playback Apparatus

Figure 6:
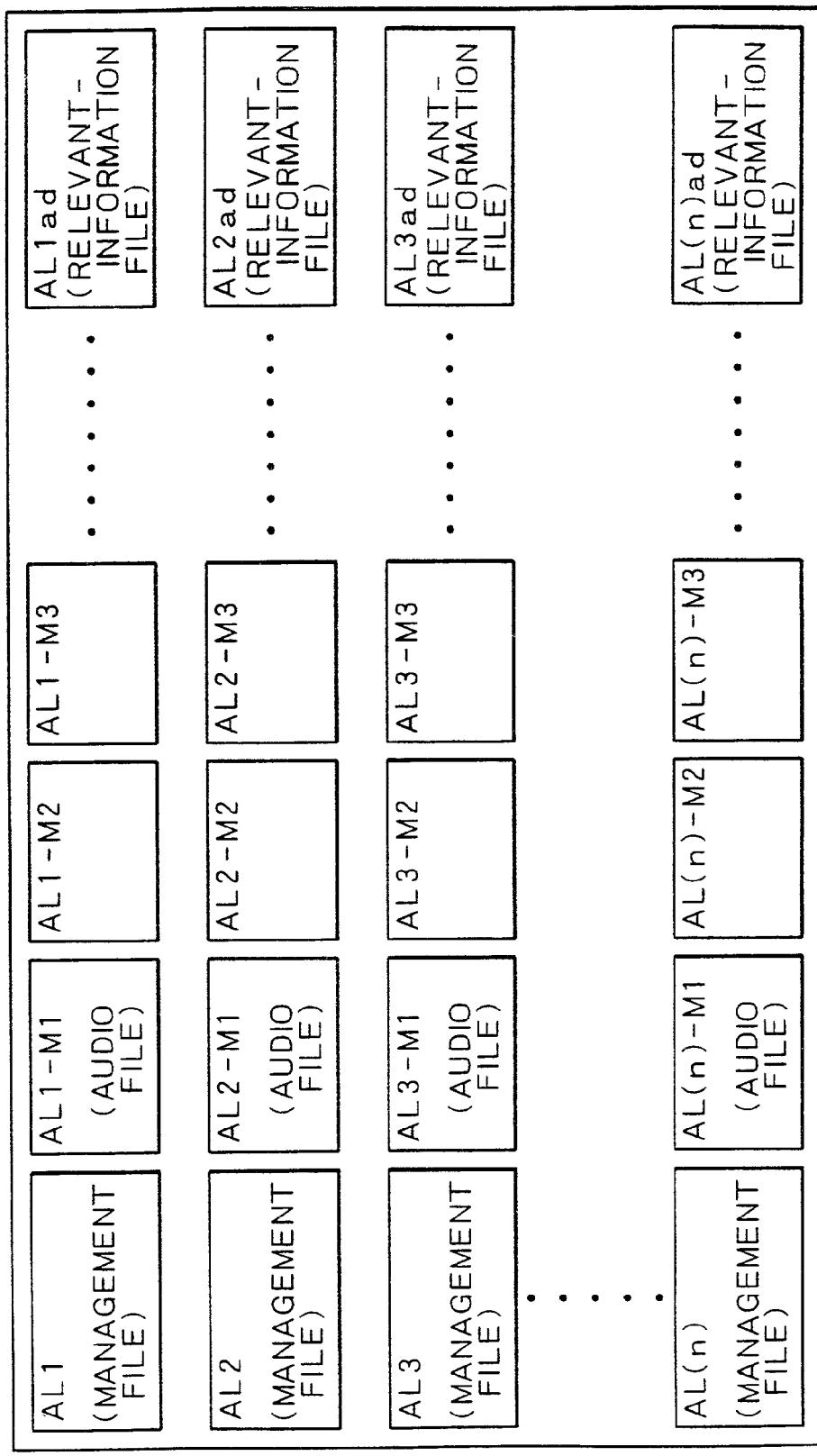
FIG. 6 is an explanatory diagram showing how files are stored in a hard disc employed in the recording/playback apparatus implemented by the embodiment of the present invention.

FIG. 6 is a diagram showing an organization of files stored in the HDD 15 employed in the recording/playback apparatus 10.

Typically, the user mounts a CD owned by itself on the CD-ROM drive 17 and stores (strictly speaking, copies) pieces of music recorded on the CD onto the HDD 15 each as a file.

Typically, pieces of music are stored onto the HDD 15 in media units such as CD units. In this case, a management file is created for each dubbed media unit or, typically, for every dubbed CD, and each piece of music or the like is stored as an audio file.

FIG. 6 shows a state in which n CDs have been dubbed into the HDD 15. As shown in the figure, a management file AL is created for each CD. Thus, for the n CDs, management files AL1 to Aln are created. Pieces of music recorded on each CD are stored as audio files associated with a management file AL corresponding to the CD.

In FIG. 6, files arranged to form a line are files dubbed from a CD. For example, data or pieces of music dubbed from a CD are stored as audio files AL1-M1, AL1-M2, AL1-M3 and so on which are associated with a management file AL1. Data or pieces of music dubbed from another CD are stored as audio files AL2-M1, AL2-M2, AL2-M3 and so on which are associated with a management file AL2. These audio files each contain data such as a piece of actual music.

When a CD is dubbed, as many audio files as dubbed pieces of music are created and a management file is formed on the HDD 15 for the audio files.

When a CD is dubbed, the user may enter data or additional information or the like can be extracted as a result of a search of a data base as described later for the data dubbed from the CD. The data entered by the user and the additional information are stored in a relevant-information file for a management file AL associated with the data dubbed from the CD. For example, a relevant-information file AL1*ad* is recorded on the HDD 15, being associated with the management file AL1.

As described earlier, data stored in a relevant-information file AL(*)ad includes texts such as titles of songs, names of artists and librettos, pictures such as musical images, photographs of artists and a picture appearing on a jacket, addresses of Internet home pages (URLs) of artists, information on a copyright and information on relevant people such as song writers, musical composers and producers.

A management file contains various kinds of management information on an audio file or a plurality of audio files and a relevant-information file that are associated with the management file. The management information is used typically in operations to play back, transfer, copy and edit the audio files and the relevant-information file.

For example, the management file AL1 contains management information for a whole group of stored audio files AL1-M1, AL1-M2, AL1-M3 which are dubbed from media such as a CD, management information for the audio files and management information for the relevant-information file AL1ad.

FIG. 7 is a diagram showing typical contents of management information stores in a management file.

Management information for a whole group of stored audio files dubbed from media such as a CD is information on the album of the CD. The information of the album includes the type of files, the number of files, the title of the album, the size of data, a dubbing date, the names of relevant people such as the producer of the album, song writers and musical composers, information on a copyright, an album ID and various kinds of other management information. An album ID is an identification code uniquely appended to an album unit (product-title unit) as media such as a CD. In this embodiment, bar-code data to be described later corresponds to an album ID.

As described above, a management file also contains pieces of management information, that is, management information #1 to management information #m which each correspond to an audio file associated with the management file. This management information includes the type of the corresponding audio file, an address pointer showing a location at which the corresponding audio file is recorded in the HDD 15, the data size of the corresponding audio file, the title of the song stored in the corresponding audio file, a dubbing date of the corresponding audio file, the names of relevant people such as the producer of the album, song writers and musical composers, information on a copyright, a playback inhibit flag and various kinds of other management information.

The playback inhibit flag is the playback inhibit flag cited in the explanation of the processing represented by the flowchart shown in FIG. 5.

As described above, a management file also contains management information for managing relevant-information files associated with the management file. This management information includes the types of the corresponding relevant-information file, the number of corresponding relevant-information files, address pointers each showing a location at which a corresponding relevant-information file is recorded in the HDD 15, dubbing dates of the corresponding relevant-information files, the names of relevant people, information on a copyright, and various kinds of other management information.

Since various kinds of management information described above are recorded on a management file, the recording/playback apparatus 10 is capable of carrying out various kinds of processing such as reproduction, transferring, copying and editing of specific piece of music. In addition, the recording/playback apparatus 10 is also capable of outputting a picture or a text as relevant information for a piece of music in concert with typically an operation to play back the piece of music.

It should be noted that details of the management information shown in FIG. 7 are typical to the bitter end. In addition, the organization of stored files shown in FIG. 6 is also typical as well. In actuality, the management data reflects the form of the file storage and the file management that are appropriate for various kinds of processing of audio files used for storing actual data.

As described above, the file in this embodiment is exemplified by an audio file of typically a piece of music. Note, however, that it is of course conceivable to use a real file for storing information such as moving-picture data, still-picture data, text data, a program serving as game software or control signals for controlling mechanical components. That is to say, it is also possible to store such information in an independent file in place of a relevant-information file.

7. First Typical Operation to Dub Data from a CD to an HDD

The following description explains an operation carried out by the recording/playback apparatus 10 to store an audio file into the HDD 15 which is a characteristic operation of the embodiment. In particular, the description explains an operation to obtain additional information for a CD serving as a dubbing source or additional information for each piece of music being dubbed.

The description explains an operation to dub data from an optical disc, such as a CD, available in the market to the HDD 15. It should be noted, however, that the following explanation holds true of an operation to dub data from various kinds of package media to the HDD 15, such as an operation to dub data from a semiconductor memory or an optical magnetic disc such as an MD to the HDD 15.

As described above, the user is capable of playing back an audio file stored in the HDD 15 employed in the recording/playback apparatus 10 or transferring such an audio file to the portable apparatus 50.

To be more specific, by storing audio files dubbed from media owned by the user such as CDs in the HDD 15 employed in the recording/playback apparatus 10 in advance, the user is capable of selecting pieces of music or the like the user wants to listen to on that day from a number of pieces of music owned by the user, and playing back the selected pieces of music, or playing back pieces of music transferred to the portable apparatus 50 at a place outside the home.

In addition, since an audio file stored in the HDD 15 is stored, being associated with a management file and a relevant-information file as shown in FIG. 6, it is possible for the recording/playback apparatus 10 to display information such as the name of the album, the title of the song, a relevant picture and a relevant photograph to the user and, hence, to implement an operation with a high added value.

In order to implement an operation with a high added value described above, it is of course necessary for the user to dub data from a CD he has on hand to the HDD 15, as well as to store the relevant file and the management file containing additional information associated with pieces of music or the like in a reproducible state in advance.

Additional information that needs to be acquired as data to be recorded onto the HDD 15 by using some means along with audio data dubbed from a CD includes various kinds of data stored in the management file shown in FIG. 7 such as the title of the album, the names of people related to the album, information on a copyright of the album, the names of songs, the names of people related to each of the songs and information on a copyright of each of the songs. The additional information also includes data composing the management-information file, such as information on a copyright and information on relevant people for the management-information file.

It is necessary for the recording/playback apparatus 10 to use some means to obtain information associated uniquely with each product title implemented as a CD, a sort of package media.

In this embodiment, a data base like one shown in FIG. 8 is a conceivable source from which the recording/playback apparatus 10 obtains additional information described above.

Figure 9:
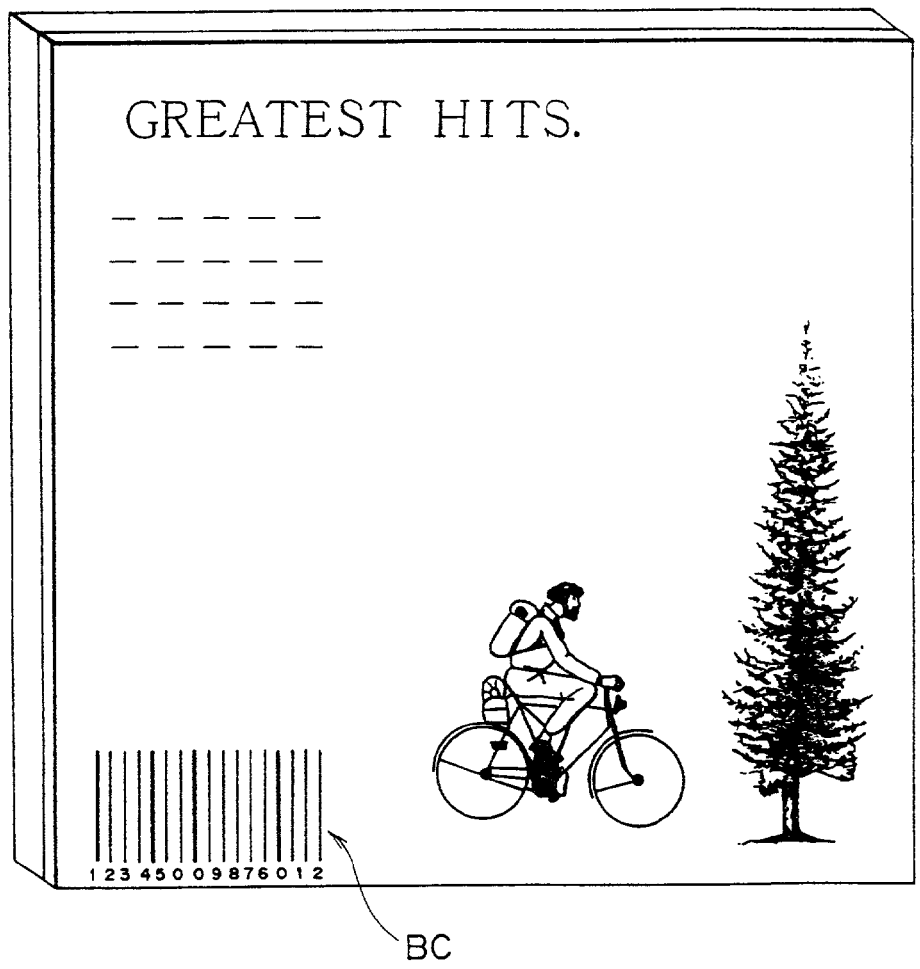
FIG. 9 is an explanatory diagram showing a bar code used in the embodiment of the present invention.

Stored in the data base shown in FIG. 8 is various kinds of additional information associated with bar-code numbers each displayed uniquely to a CD title serving as a product. That is to say, a bar code BC is displayed on typically a portion of the jacket of a CD available in the market as shown in FIG. 9. Normally, this bar code BC is a bar-code number expressed by a bar-code pattern which can be read by a bar-code scanner.

Since a bar-code number is a number peculiar to the product title of a CD, there will be no case in which different product titles have the same bar-code numbers or the same product titles have different bar-code numbers.

Accordingly, the data base holds bar-code numbers each as a number peculiar to the product title of a CD as shown in FIG. 8 and additional information unique to a product title associated with each bar-code number. As described above, the additional information stored in the data base includes information on an album (such as the title of the album and the names of people relevant to the album such as artists contributing to the album), information on tracks (such as the names of songs of musical tracks #1 to #n recorded on the album and the names of relevant people) and information related to the album such as a picture displayed on the jacket and URLs. The data base thus classifies and stores the additional information unique to a product title correctly.

By using a bar-code number as a search key, the data base can be searched for additional information associated with a product title representing a CD indicated by the bar-code number with a high degree of accuracy.

The data base needs to be installed in the HDD 15. As an alternative, the data base can also be presented to the user as a CD-ROM or MD-DATA. The recording/playback apparatus 10 is thus capable of searching the data base by using a bar-code number obtained typically from a CD for additional information associated with audio files dubbed from the CD to the HDD 15 when the additional information is required.

In the case of the information distributing system shown in FIG. 1 wherein the recording/playback apparatus 10 is connected to the information center 1, the data base is controlled by the information center 1. According to this conceivable alternative, the recording/playback apparatus 10 transmits a bar-code number of a CD subject to search operation to the information center 1, whereas the information center 1 searches the data base for the additional information by using the bar-code number as a key and transmits the additional information obtained as a result of the search to the recording/playback apparatus 10.

It should be noted that, in the following description of the operation, the data base is installed in the HDD 15 or presented to the user in the form of a CD-ROM.

First of all, in the first typical operation carried out by the recording/playback apparatus 10 to dub data from a CD to the HDD 15, the data base is searched for additional information associated with an input bar code at the end of the dubbing operation.

Figure 10:
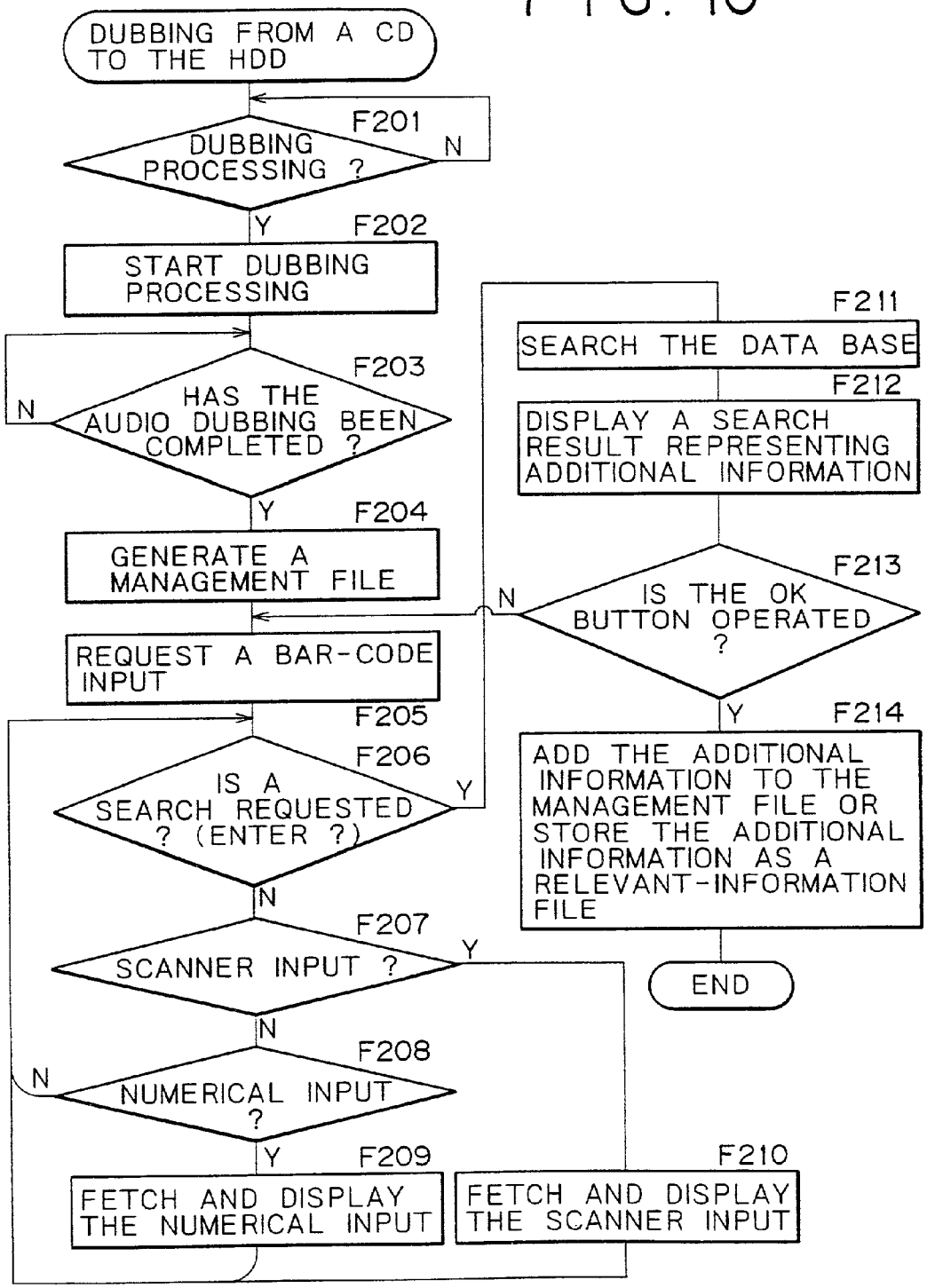
FIG. 10 shows a flowchart representing a first typical operation carried out by the embodiment of the present invention.

In this case, the CPU 11 carries out processing represented by a flowchart shown in FIG. 10.

As shown in FIG. 10, the flowchart begins with a step F201 at which the CPU 11 forms a judgment as to whether or not the user has made a request for a dubbing operation. If the outcome of the judgment indicates that the user has not made a request for a dubbing operation, the formation of the judgment is repeated till such a request is detected. In the mean time, assume that the user mounts a CD on the CD-ROM drive 17 and lets a dubbing operation be carried out. In this case, the flow of the processing carried out by the CPU 11 goes on from the step F201 to a step F202. At the step F202, the CPU 11 executes control to start a dubbing operation to store music data played back from the CD into the HDD 15 as audio files through the processing path described earlier.

The flow of the processing then proceeds to a step F203 to wait for the operation for dubbing audio data, that is, data of all pieces of music recorded on the CD, to be completed.

As the dubbing operation of audio data is completed, the flow of the processing continues to a step F204 at which, first of all, a management file is created for the audio files stored on the HDD 15 containing the dubbed audio data. To put it in detail, a management file like the one shown in FIG. 7 is set to contain physical management data of the audio files, or pieces of music, dubbed from a CD. As described earlier, the management data includes the size of the data, the type of the files, address pointers and a dubbing date. The management data is minimum information required to control each of the audio files and to put them in a state of being controllable in a playback operation.

Of course, at this point of time, the aforementioned additional information for the group of dubbed audio files or the CD album and for each of the audio files or each piece of music has not been obtained. Thus, the management data stored in the management file does not include additional information for the CD, such as the title of the album, the names of the songs and the names of relevant people shown in FIG. 7.

The flow of the processing then goes on to a step F205 at which the CPU 11 starts processing to acquire additional information associated with the group of dubbed audio files.

First of all, at the step F205, a screen like the one shown in FIG. 11 is displayed on the display unit 24 under control executed by the CPU 11 to request the user to enter a bar code. That is to say, the user is requested to enter a bar-code number appearing on the jacket of the CD serving as a dubbing source as shown in FIG. 9.

As a technique to enter the bar code, the bar-code scanner 92 may be used. There are two types of the bar-code scanner 92.

With the bar-code scanner 92 of one type, a bar-code pattern of a picture signal input from an image pickup device such as a CCD is recognized. As a conceivable operation, the user exposes a bar code portion on the jacket of a CD album to the CCD employed in the recording/playback apparatus 10. As an alternative, a CD-album-jacket mounting unit is provided on the recording/playback apparatus 10. In this case, the user places the jacket of a CD album on the CD-album-jacket mounting unit as part of the user's operation. With a CD-album-jacket mounting unit provided on the recording/playback apparatus 10, the recording/playback apparatus 10 is designed into a configuration wherein the image pickup device such as a CCD is installed at a position facing a bar code portion on the jacket of a CD album placed on the CD-album-jacket mounting unit. In this way, when the user places the jacket of a CD album on the CD-album-jacket mounting unit, the CCD automatically reads a bar code portion on the jacket of a CD album mounted on the CD-album-jacket mounting unit and supplies the bar code to the recording/playback apparatus 10.

In the case of the bar-code scanner 92 of the second type, a laser scanning type, on the other hand, a laser beam is radiated to a bar-code pattern in a plurality of scan directions. Then, a scan direction is determined in accordance with waves reflected by the bar-code pattern, and a bar code is recognized from a reflected wave of the laser beam radiated in the determined scan direction. As a conceivable operation, the user takes the bar-code scanner 92 to a position in close proximity to the bar-code portion of the jacket of a CD album. As an alternative operation, the user takes a bar-code portion of the jacket of a CD album to a position in close proximity to the bar-code scanner 92 which is fixed at a certain position, and lets the bar-code scanner 92 scans the bar-code pattern.

As an alternative to the use of the bar-code scanner as a means to enter a bar code, an operation screen showing the ten keys or numeric keys shown in FIG. 11 is displayed and the user is capable of entering a bar-code number by pointing to the keys using the input pen 93 without resorting to the bar-code scanner 92. At that time, the user enters a number beneath a bar-code pattern appearing on the jacket of the CD. Of course, a number can also be entered via the keyboard 90 or the remote commander 91. In addition, the ten keys provided on the panel operation unit 20 may be used.

The user enters a bar code read out by the bar-code scanner 92 or entering a bar-code number for numerical characters displayed on a screen like the one shown in FIG. 11 by means of ten keys at the following step F206. The CPU 11 then forms a judgment as to whether the user makes a request for a search operation.

If the outcome of the judgment indicates that the user does not make such a request, the flow of the processing goes on to a step F207 at which the CPU 11 forms a judgment as to whether or not the bar-code scanner 92 is used. If the result of the judgment indicates that the bar-code scanner 92 is not used, the flow of the processing proceeds to a step F208 to wait for the operation for entering a bar-code number as numerical characters to be completed. If the result of the judgment indicates that the bar-code scanner 92 is used, on the other hand, the flow of the processing proceeds to a step F210 at which a decoded bar-code number input by the bar-code scanner 92 is fetched and displayed on the display unit 24 as shown in FIG. 12.

As the operation carried out by the user to enter a bar-code number as numerical characters is completed at the step F208, the flow of the processing goes on to a step F209 at which the bar-code number is similarly fetched and displayed on the display unit 24 as shown in FIG. 12.

The user verifies the number displayed on the screen like the one shown in FIG. 12 before confirming that the bar-code number has been input without an error, or confirming that the numerical characters have been entered as a correct bar-code number. As the input bar-code number is confirmed, the user carries out an operation to make a request for a search. For example, while the CPU 11 is displaying a search operation screen like the one shown in FIG. 12, the user is capable of carrying out an operation to make a request for a search by pointing a search button appearing on the screen by means of the input pen 93.

It should be noted that, if the user finds out that the bar-code number has been input with an error or that the numerical characters have not been entered as a correct bar-code number, the flow of the processing goes back to the step F206 at which the operation to enter a bar-code number is repeated. In this case, a number fetched and displayed at the step F209 or F210 is updated, accordingly.

The flow of the processing then goes back from the step F209 or F210 to the step F206. As the user carries out an operation to make a request for a search at the step F206, the flow of the processing goes on to a step F211 at which the data base described above is searched with the confirmed input bar-code number used as a search key.

At this point of time, a message appearing on the display unit 24 requests the user to mount a CD-ROM containing the data base into the CD-ROM drive 17. Upon mounting such a CD-ROM therein, a search operation is started. If the data base is located in the information center 1, the request for a search is passed on by the recording/playback apparatus 10 to the information center 1 which will then transmit a result of the search to the recording/playback apparatus 10 by communications. It should be noted that, if the data base is installed in the HDD 15, neither the operation to mount a CD-ROM nor the processing to pass on the request for a search is required.

As described above, the data base is used for storing additional information for every bar-code number which serves as identification information representing the product title of a CD. Thus, the data base can be searched by using an input bar-code number to read out additional information associated with a CD used as a dubbing source.

Figure 13:
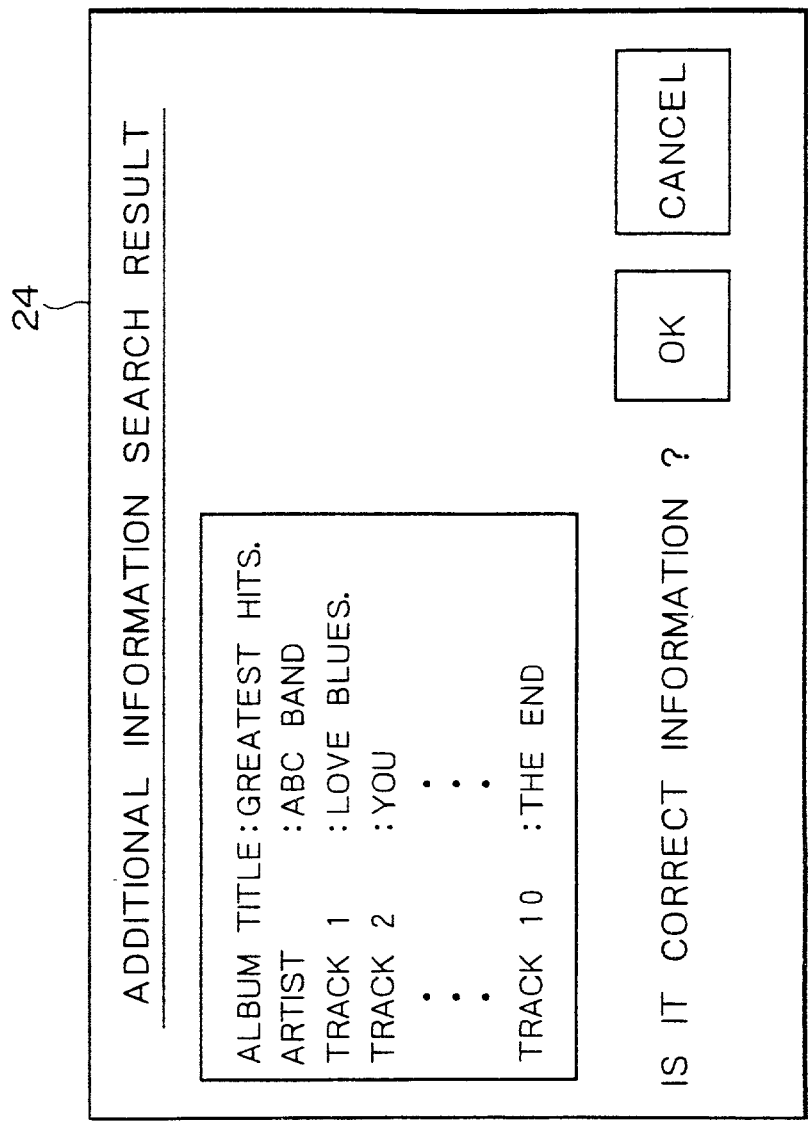
FIG. 13 is an explanatory diagram showing a typical displayed screen provided by the embodiment of the present invention to show first additional information obtained as a result of a search operation.

As the operation carried out by the CPU 11 to search the data base for additional information is completed, the flow of the processing proceeds to a step F212 at which the result of the search operation is displayed to the user. Part or all of the additional information obtained such as data shown in FIG. 13 is displayed and the user is requested to confirm that the displayed information is correct. That is why the screen shown in the figure includes an OK operation button and a cancel operation button at the same time to be operated by the user to express an OK and an NG, respectively.

It should be noted that pieces of additional information stored in the data base are associated with product titles of CDs each represented by a bar code on a 1:1 basis. Thus, if the bar code input by the user is correct, there will be almost no case in which additional information found in a search operation does not correspond to the CD dubbed this time.

However, it is quite within the bounds of possibility that the user enters a bar code presented on a jacket other than that of a CD dubbed this time. It is thus proper to display results of a search operation like the ones shown in FIG. 13 and request the user to confirm the results.

If the user finds an error after viewing the search results, the user may operate the cancel operation button. If the cancel operation button is found operated at a step F213 following the step F212, the flow of the processing goes back to the step F205 to repeat the operation to enter a bar code and a search operation on the data base. Error processing can also be carried out, instead of repeating the operation to enter a bar code and a search operation, typically, by not storing the additional information in the HDD 15.

If the user operates the OK operation button after viewing the search results, on the other hand, the flow of the processing goes on from the step F213 to a step F214 at which the management file is updated by adding the additional information found by the search operation in the data base under control executed by the CPU 11. If relevant information such as picture data to be cataloged as a relevant-information file is included in the additional information found in the search, the relevant information is stored in the HDD 15 as a relevant-information file. In this case, information on the relevant-information file is of course added to the management file, being associated with the created relevant-information file. In addition, the value of the bar-code number may be recorded as an album ID shown in FIG. 7.

As a result of this processing, a group of audio files dubbed from a CD is controlled by a management file containing additional information, and in some cases a relevant-information file as an additional information is added thereto as described earlier by referring to FIGS. 6 and 7 are created.

The creation of management and relevant-information files ends the dubbing processing sequence.

In the processing to dub data from a CD to the HDD 15 as audio files, a data base is searched for additional information by using a bar code as a search key as described above. The additional information found in the search is then stored in the HDD 15, being associated with the audio files. Thus, the additional information is associated correctly with the CD serving as a dubbing source. That is to say, the reliability of the additional information found as a search result is improved substantially in comparison with a search using for example TOC information as a search key. Thus, in an operation to play back the audio files or other operations, the additional information stored in the management file, or the relevant-information file can be displayed to the user. As a result, the service function of the apparatus and the reliability of presented information are improved.

Since a data base may be installed in the HDD 15 or may be presented to the user in the form of a CD-ROM, it is possible to provide the so-called stand-alone recording/playback apparatus 10, that is, a recording/playback apparatus 10 without a need to construct a system of communication with the information center 1 for operations carried out by the embodiment.

It should be noted that, since it is necessary to store additional information for many CDs available in the market into the data base, the size of the data base must be relatively large. If the additional information comprises only text data, such as names of albums and titles of songs, a CD-ROM will provide a sufficient storage capacity to serve as the data base to cover the information.

If the additional information also includes picture data such as a picture appearing on the jacket of an album, however, it is quite within the bounds of possibility that the size of the data is too large to store as a data base recorded on a CD-ROM or installed in the HDD 15. In such a case, it is conceivable to provide a data base installed in another storage medium with a large recording capacity such as an external HDD. In this case, however, the equipment load to be borne by the user is too large. If the reduction of such a load is to be taken into consideration, it is appropriate to provide the data base in the information center 1.

In order to keep up with a situation in which CDs are put in the market one after another as new products, it is also necessary to update the data base and to add new information to the data base. In the case that a data base is presented to the user in the form of a CD-ROM to be installed in the HDD 15 of the recording/playback apparatus 10 or to be used as it is, it is desirable to provide the user with a CD-ROM with an upgraded version containing data of newly released products periodically.

In the case of a data base controlled in the information center 1, on the other hand, it is possible to provide a data-base management system that keeps up with release of new products quickly by for example updating the data base typically everyday. In this case, a data-base management system is necessary.

In this embodiment, a bar-code number is used as information for identifying the title of a CD. Therefore, A bar code can be assigned to CDs sold in the past and, by using a data base of a bar-code system such as a POS (Point Of Sales), the data base described above can be constructed with ease.

In addition, a bar code can be input very easily by the user using the bar-code scanner 92. If the bar-code scanner 92 is not available, the number of the bar code can be entered by the user. As a result, a bar-code system is convenient for the user.

Moreover, by recording a bar-code number in a management file as an album ID, the bar-code number can be used in a variety of services rendered for the user and a market research conducted by the information center 1.

For example, assume that the information center 1 is capable of obtaining a bar-code number representing the ID of an album of data stored in the HDD 15 through a communication with the recording/playback apparatus 10. In this case, the information center 1 is capable of identifying the CD purchased by the user on the basis of an album ID and providing the user with information on genres and artists liked by the user selected in accordance with the identified CD. In this way, IDs of albums purchased by users can be used as a material in the so-called market research.

8. Second Typical Operation to Dub Data from a CD to an HDD

A second typical operation to dub data from a CD to an HDD described below is also an operation to dub data from a CD to an HDD which can be implemented by the recording/playback apparatus 10 in the same way.

In the second typical operation carried out by the recording/playback apparatus 10 to dub data from a CD to the HDD 15, however, the data base is searched by using an input bar code as a key for additional information while the dubbing operation is under way.

Figure 14:
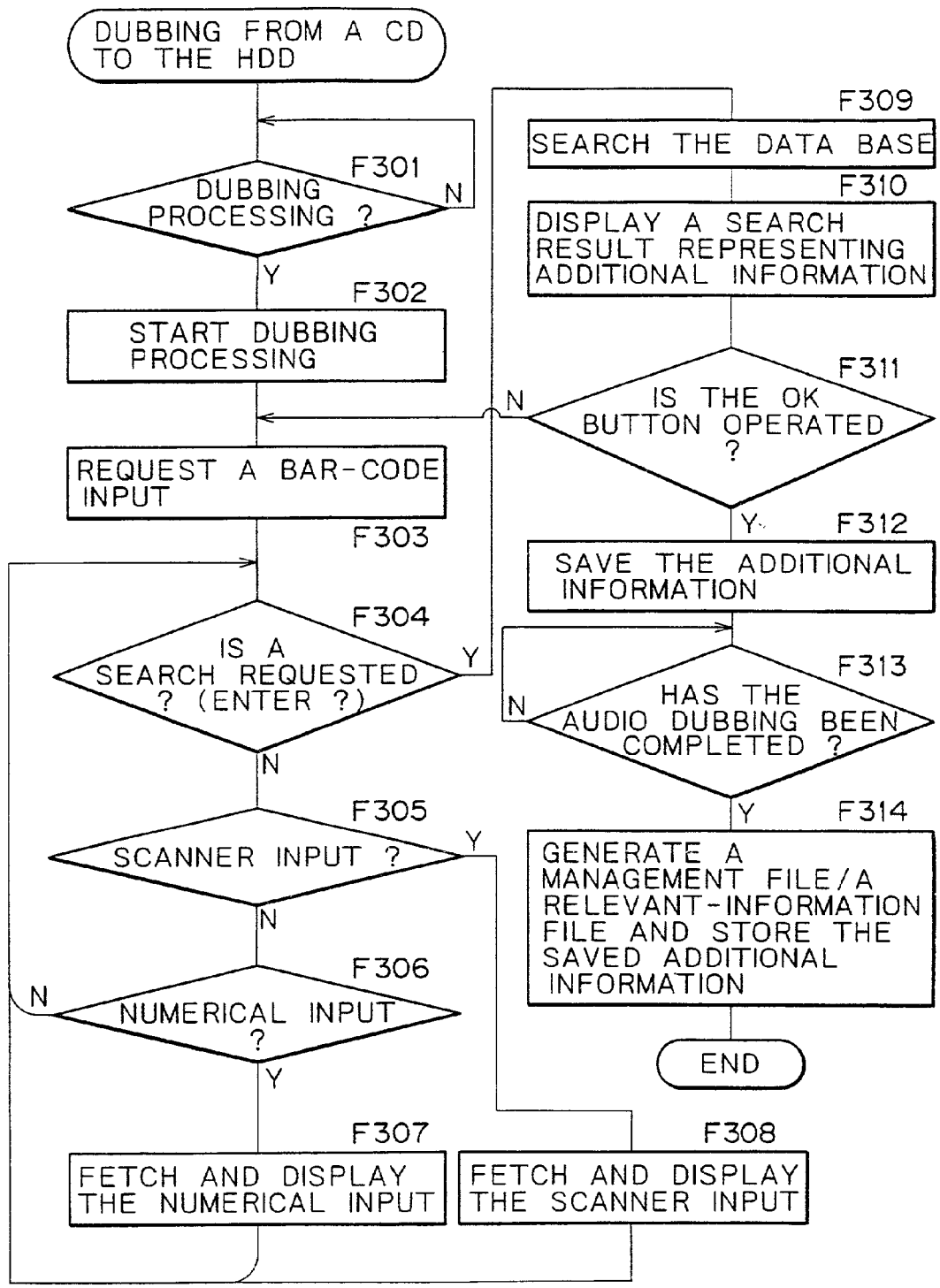
FIG. 14 shows a flowchart representing second typical processing carried out by the embodiment of the present invention.

A flowchart representing the processing carried out by the CPU 11 to implement the second typical operation is shown in FIG. 14.

As shown in the figure, the flowchart begins with a step F301 to form a judgment as to whether or not the user has made a request for a dubbing operation. If the outcome of the judgment indicates that the user has made a request for a dubbing operation, the formation of the judgment is repeated. As the user mounts a CD on the CD-ROM drive 17 and lets a dubbing operation be carried out, the flow of the processing carried out by the CPU 11 goes on from the step F301 to a step F302 of the flowchart shown in FIG. 14. At the step F302, the CPU 11 executes control to start a dubbing operation to store musical data played back from the CD into the HDD 15 as audio files.

At the point of time the dubbing operation is started by the recording/playback apparatus 10, the flow of the processing is continued to a step F303 at which the CPU 11 carries out processing to obtain additional information associated with a group of audio files while the dubbing operation is under way.

Since processing of the step F303 to a step F311 is the same as the processing of the steps F205 to F213 of the flowchart shown in FIG. 10, details thereof are not repeated. In a word, the user is requested by the recording/playback apparatus 10 to enter a bar code and, after the user confirms a bar-code number input by the bar-code scanner 92 or entered as numerical characters, the data base is searched. If a result of the search is judged by the user to be OK, the result of the search is stored as additional information.

If the user confirms the additional information found in the search of the data base to be information associated with the CD being dubbed by the user currently, that is, if the user operates the OK operation button appearing on the search-result displaying screen of FIG. 13 displayed at a step F310, the CPU 11 continues the processing from a step F311 to a step F312 at which the additional information found in the search of the data base is stored typically into the RAM 13.

The processing then goes on to a step F313 to wait for the operation for dubbing audio data, that is, data of all pieces of music recorded on the CD, to be completed.

As the operation carried out by the recording/playback apparatus 10 to dub the audio data is completed, the flow of the processing goes on to a step F314 at which a management file is created for audio files recorded on the HDD 15 during the dubbing operation under control executed by the CPU 11. To put it in detail, a management file like the one shown in FIG. 7 is set to contain physical management data of the audio files of pieces of music dubbed from a CD. As described earlier, the management data includes the size of the data, the type of the files, address pointers and a dubbing date. At this point of time, since the aforementioned additional information for the CD has been obtained, it is also recorded in the management file. The additional information includes the title of the album, the names of the songs and the names of relevant people.

In addition, if relevant information such as audio data like a service track and picture data to be cataloged as a relevant-information file is included in the additional information found in the search, the relevant information is stored in the HDD 15 as a relevant-information file. In this case, information on the relevant-information file is of course added to the management file, being associated with the created relevant-information file.

As a result of this processing, a group of audio files dubbed from a CD, a management file containing additional information for controlling the audio files and in some cases a relevant-information file containing relevant information described earlier by referring to FIGS. 6 and 7 are created.

The creation of management and relevant-information files ends the dubbing processing sequence.

Much like the first typical operation described above, in this typical operation, accurate additional information can be stored, being associated with audio files.

In the case of the second typical operation, a bar code is entered by the user and the data base is searched while the dubbing operation is being carried out. Thus, the operations to input a bar code and to search the data base can be finished earlier due to efficient use of time. For this reason, the second typical operation is appropriate for a case in which it takes a long time to search the data base or the data base is located in the information center 1, requiring a communication for a search.

Furthermore, the second typical operation is advantageous to the user in that, since a bar code can be entered right after dubbing is started, it is not necessary for the user to wait the dubbing to be completed in order to enter the bar code.

The following description explains a third typical operation considering a case in which accounting control is executed with reference to FIGS. 15 and 16.

Additional information of FIG. 13 obtained as a search result may further include a fee information 401 and a check box 402 for each piece of additional information as shown in FIG. 15. The check box allows the user to determine whether the additional information associated with the check box is needed.

The operation of a third embodiment, that is, the third typical operation, is explained by referring to FIG. 16. It should be noted that description of portions of the operation identical with the second embodiment shown in FIG. 12 is omitted.

The explanation begins with a step F310 at which additional information screen like the one shown in FIG. 15 is displayed on the display unit 24 as a search result. The flow of the processing then goes on to a step F311 to let the user select necessary additional information. The user selects pieces of desired additional information by checking the check boxes 402 associated with the selected pieces. The selection is based on the fee information 401. In the example shown in FIG. 15, the user has checked the check boxes 402 to select the title of an album, the name of an artist and the title name of track 2 or the libretto of the song. A total fee of 30 yen will be charged to the user when the selected pieces of additional information is recorded onto the HDD 15 along with dubbed audio data. Then, when the user presses the OK button at the step F311, the flow of the processing goes on to a step F500.

At the step F500, accounting processing is carried out for the user's account. There are a variety of possible accounting methods. For example, a connection to an accounting information network is made by the information center 1 to execute control to automatically draw a certain amount of money from the user's account recorded in advance and pay the drawn amount of money to a predetermined account. As an alternative, the total fee is recorded on the HDD 15 at any time under the control executed by the CPU 11 and, once a month, the recording/playback apparatus 10 transmits the fee owed by the user to the accounting network by way of the transmission line 3. The accounting network executes control to automatically draw a certain amount of money from the user's account recorded in advance and pay the drawn amount of money to the predetermined account.

When the accounting process carried out at the step F500 is completed, the flow of the processing goes on to the step F312 and the subsequent steps. Finally, control is executed to record only the additional information selected by the user into the HDD 15 and to associate the additional information with dubbed audio information.

In this way, it is possible to provide a system which is capable of running not only the ordinary business to distribute musical data but also a business to distribute additional information. In this case, the additional information may include not only a text and a still-picture but also a moving picture of typically a concert, a bonus track and audio information as the real voice of an artist.

The configuration and typical operations of the embodiment have been described so far. A number of other operations are conceivable.

For example, it is also possible to provide a configuration wherein bar codes for a number of audio-file groups or for data of a number of CDs recorded in the HDD 15 can be entered in a one-time operation.

To put it in detail, while specifying CD dubbing data already recorded on the HDD 15 for one album after another, a bar code for each album is entered. When a bar-code number is entered, the CPU 11 searches the data base for additional information with the bar-code number used as a search key and the additional information found in the search is added to a management file associated with data of a CD album or a group of audio files represented by the bar-code number, or a relevant-information file is created.

In this way, the user is capable of entering bar codes in a one-time operation at a certain point of view. Thus, such a configuration is convenient for the user.

In the embodiments described above, the bar code represents information identifying the product title of a CD. It should be noted, however, that identification information represented by a bar code can be a record number, a manufacturing code number or the like.

The embodiments described above each have a configuration wherein additional information is acquired when data is dubbed from package media such as a CD to the recording/playback apparatus. It should be noted, however, that additional information can be acquired from another server when audio data is distributed from the information center provided that identification information is supplied.

In addition, it is needless to say that a variety of implementations are conceivable for the configuration of the recording/playback apparatus, the configuration of the system including other equipment and other configurations.

In the embodiments described above, additional information is recorded into the HDD, being associated with dubbed audio data. It is worth noting, however, that the additional information such as a jacket picture or a libretto can also output to a printer. In addition, the libretto can also be read to produce an audio output.

What is claimed is:

1. A recording and/or playback apparatus for recording data read out from a first storage medium into a second storage medium, said apparatus comprising:
    recording means for recording data read out from said first storage medium into said second storage medium;
    input means for inputting identification data that is not stored in the first storage medium and for identifying said data stored in said first storage medium in accordance with an operation carried out by a user; and
    control means for executing control to record additional information related to said data read out from said first storage medium and generated based on said identification data input by said input means to said second storage medium after a recording operation by said recording means on said second storage medium is completed,
    wherein, said control means further includes means for sending said identification data input by said input means to a source located at a remote location for searching a specific piece of said additional information which is stored at said source, and means for obtaining said additional information associated with said identification data.

2. The recording and/or playback apparatus according to claim 1, wherein said input means inputs said identification data derived from identification data displayed on a package accommodating said first storage medium.

3. The recording and/or playback apparatus according to claim 1, wherein said input means inputs said identification data derived from identification data located on said first storage medium.

4. The recording and/or playback apparatus according to claim 1, wherein said identification data is in a form of bar-code data for said first storage medium.

5. The recording and/or playback apparatus according to claim 1, further comprising:
    additional-information storage means for storing pieces of additional information; and
    said control means further includes means for searching said additional-information storage means for a specific piece of additional information associated with said identification data input by said input means.

6. The recording and/or playback apparatus according to claim 1, further comprising a playback means for reading out said data from said first storage medium.

7. The recording and/or playback apparatus according to claim 6, wherein said data read out from said first storage medium is distributed to a remote location.

8. A recording and/or playback method for recording data read out from a first storage medium into a second storage medium, said method comprising the steps of:
    recording said data read out from said first storage medium into said second storage medium;
    inputting identification data that is not stored in the first storage medium and for identifying said data stored in said first storage medium in accordance with an operation carried out by a user;
    sending said identification data input in said inputting step to a source located at a remote location for searching a specific piece of additional information which is stored at said source; and
    obtaining said additional information associated with said identification data; and
    executing control to record said additional information related to said data read out from said first storage medium and generated based on said identification data input to said second storage medium after a recording operation by said recording means on said second storage medium is completed.

9. The recording and/or playback apparatus according to claim 1, wherein said control means makes a management file of recorded data in said second storage medium, the management file including at least said additional information.

10. A recording and/or playback apparatus configured to record data read out from a first storage medium into a second storage medium, said apparatus comprising:
    recording unit configured to record data read out from said first storage medium into said second storage medium;
    inputting unit configured to input identification data that is not stored in the first storage medium and for identifying said data stored in said first storage medium in accordance with an operation carried out by a user; and
    controlling unit configured to control recording of additional information related to said data read out from said first storage medium and generated based on said identification data input by said inputting unit to said second storage medium after a recording operation by said recording unit on said second storage medium is completed,
    wherein, said controlling unit further includes a unit configured to send said identification data input by said inputting unit to a source located at a remote location for searching a specific piece of said additional information which is stored at said source and to obtain said additional information associated with said identification data.

* * * * *